United States Patent
Kennedy et al.

(10) Patent No.: US 6,963,847 B1
(45) Date of Patent: Nov. 8, 2005

(54) SYSTEM AND METHOD FOR MANAGING ATP DATA IN A DISTRIBUTED SUPPLY CHAIN PLANNING ENVIRONMENT

(75) Inventors: Brian M. Kennedy, Coppell, TX (US); Stanton L. Thomas, Truckee, CA (US); Herbert V. Joiner, Plano, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/398,171

(22) Filed: Sep. 17, 1999

Related U.S. Application Data

(60) Provisional application No. 60/100,964, filed on Sep. 18, 1998.

(51) Int. Cl.[7] .......................... G06F 17/60; G06F 15/16; G06F 17/30
(52) U.S. Cl. .................. 705/8; 705/1; 705/36; 709/203; 709/217; 707/3; 707/10
(58) Field of Search .................. 705/1, 36; 709/203, 709/217; 707/3, 10

(56) References Cited

U.S. PATENT DOCUMENTS

| | | | |
|---|---|---|---|
| 4,209,845 A | 6/1980 | Berger et al. | 364/900 |
| 4,611,280 A | 9/1986 | Linderman | 364/300 |
| 4,611,310 A | 9/1986 | Durbin | 365/230 |
| 4,737,910 A | 4/1988 | Kimbrow | 364/403 |
| 4,827,423 A | 5/1989 | Beasley et al. | 364/468 |
| 5,089,970 A | 2/1992 | Lee et al. | 364/468 |
| 5,101,352 A | 3/1992 | Rembert | 364/401 |
| 5,128,861 A | 7/1992 | Kagami et al. | 364/403 |
| 5,148,370 A | 9/1992 | Litt et al. | 364/468 |
| 5,175,857 A | 12/1992 | Inoue | 395/800 |
| 5,216,612 A | 6/1993 | Cornett et al. | 364/468 |

(Continued)

FOREIGN PATENT DOCUMENTS

| | | | |
|---|---|---|---|
| EP | 0231552 A1 | 12/1986 | G06F/7/24 |
| EP | 0425405 A2 | 5/1991 | G06F/15/24 |
| EP | 0466089 A2 | 7/1991 | G06F/15/12 |
| EP | 0466090 A2 | 7/1991 | G06F/15/21 |
| EP | 0463616 A2 | 1/1992 | G06F/15/21 |
| EP | 0615198 A1 | 9/1994 | G06F/15/21 |
| GB | 2293902 A | 4/1996 | G05B/19/418 |
| WO | WO 97/44749 | * 11/1997 | 395/226 |

OTHER PUBLICATIONS

SAP Business Software: SAP Announces R/3 3.1 Enterprise Business Software, 1999, Business Wire.*

Debra O'Donnell, Collaborating Across The Supply Chain, Sep. 1998, Software Megazine.*

(Continued)

*Primary Examiner*—John G. Weiss
*Assistant Examiner*—Naresh Vig
(74) *Attorney, Agent, or Firm*—James E. Walton; Brian E. Harris

(57) ABSTRACT

A fulfillment server (16) for managing ATP data in a distributed supply chain planning environment receives an ATP request (30) from one of multiple clients (12). The ATP request (30) includes multiple request line-items that each correspond to a desired product. The fulfillment server (16) then generates one or more component ATP requests (32) based on the request line-items and communicates component ATP requests (32) to at least one of multiple local fulfillment managers (14). In response, the fulfillment server (16) receives component quotations (34) from the local fulfillment managers (14), each corresponding to a component ATP request (32) and each including product availability information for the corresponding desired product. The fulfillment server (16) generates a quotation (36) that includes product availability information for all desired products, according to the component quotations (34), and communicates the quotation (36) to the client (12).

76 Claims, 2 Drawing Sheets

U.S. PATENT DOCUMENTS

| | | | | |
|---|---|---|---|---|
| 5,218,700 | A | | 6/1993 | Beechick .................... 395/700 |
| 5,233,533 | A | | 8/1993 | Edstrom et al. ............ 364/468 |
| 5,280,425 | A | | 1/1994 | Hogge ........................ 364/402 |
| 5,303,144 | A | | 4/1994 | Kawashima et al. ........ 364/401 |
| 5,369,570 | A | | 11/1994 | Parad ......................... 364/401 |
| 5,712,989 | A | | 1/1998 | Johnson et al. ............. 395/228 |
| 5,809,144 | A | | 9/1998 | Sirbu et al. .................... 380/25 |
| 5,974,395 | A | * | 10/1999 | Bellini et al. ................... 705/9 |
| 5,979,757 | A | | 11/1999 | Tracy et al. ................ 235/383 |
| 5,995,947 | A | * | 11/1999 | Fraser et al. ................... 705/35 |
| 5,999,908 | A | | 12/1999 | Abelow .......................... 705/1 |
| 6,012,041 | A | | 1/2000 | Brewer et al. ................ 705/28 |
| 6,085,170 | A | | 7/2000 | Tsukuda ...................... 705/26 |
| 6,119,102 | A | * | 9/2000 | Rush et al. .................... 705/29 |
| 6,324,522 | B2 | * | 11/2001 | Peterson et al. ............. 705/22 |
| 6,463,345 | B1 | * | 10/2002 | Peachey-Kountz et al. ... 700/99 |
| 2001/0011222 | A1 | * | 8/2001 | McLauchlin et al. .......... 705/1 |

OTHER PUBLICATIONS

Stannie Holt, Packaged Application And Internet Technology Can Improve The Bottom Line, Nov. 1998, InfoWorld.*

Darling et al., Extreme Integration, Nov. 1996, The Gale Group.*

Bodington et al., Optimize The Supply Chain, Sep. 1996, The Gale Group.*

Eruc Allen, Supply Chain Management Software, May 1998, University of Texas, Austin http://esallen.home.mindspring.com/erp.SCH.htm.*

SAP Annual Report—1998, SAP Ag. http://www.sap-ag.de/company/investor/reports/ar_onlin/1998/init_e.asp.*

Available to Promise (ATP) http://sandbox.aiss.uiuc.edu/oracle/nca/mrp/atp.htm.*

Kevin Parker, "Demand Management and Beyond," Manufacturing Systems Supply–Chain Strategies: Forecasting and Demand Management, Supplement, p. 2A–14A, Jun. 1996.

Romeo Castagna, "A Model for Evaluating Manufacturing System Time Performances," Integrated Manufacturing Systems, v. 3, No. 3, p. 15–21, 1992.

Tim Foxlow, "Knowledge–Based Manufacturing: The Key to Recovery," Logistics Information Management, v. 7, No. 4, p. 23–26, 1994.

Marilyn K. McClelland, "Using Simulation to Facilitate Analysis of Manufacturing Strategy," Journal of Business Logistics, v. 13, No. 1, p. 215–237, 1992.

David M. McCutcheon, "The Customization–Responsiveness Squeeze," Sloan Management Review, v. 35, No. 2, p. 89–99, Winter 1994.

Frank O. Smith, "Dun & Bradstreet Software Delivers Sales and Promotion System to Manufacturers," Business Wire, s. 1, p. 1, Jun. 11, 1990.

Dusty Rhodes, "The Keys to the Enterprise: Integrated Applications Drive Information Systems to New Horizons," HP Professional, v. 5, No. 11, p. 44–46, Nov. 1991.

Anonymous, Dialog File 148, No. 8283166, Concentra and i2 Technologies to integrate sales configuration with global supply chain management; Product configuration recognized as critical link in intelligent global supply chain management, Business Wire, 2 pages, Oct. 10, 1995.

Anonymous, MRP upstaged (One trend in the software industry is that the top enterprise–resource–planning software companies are outright supplanting the core planning functions of their manufacturing–resource planning (MRP II) systems or are augmenting them with new scheduling software that provides real–time decision support), Industry Week, v. 246, n. 3, 4 pages, Feb. 3, 2997.

Notification of Transmittal of International Preliminary Examination Report, Oct. 24, 2000.

PCT Notification of Transmittal of the International Search Report or the Declaration, 4 pages, May 12, 2001.

* cited by examiner

SYSTEM AND METHOD FOR MANAGING ATP DATA IN A DISTRIBUTED SUPPLY CHAIN PLANNING ENVIRONMENT

CROSS-REFERENCE TO RELATED APPLICATIONS

This Application claims the benefit of Ser. No. 60/100,964, filed Sep. 18, 1998. This Application is also related to copending U.S. application Ser. No. 08/491,167, filed Jun. 16, 1995 by Kennedy et al. for a "System and Method for Managing Available to Promise (ATP)," and copending U.S. application Ser. No. 08/802,434, filed Feb. 18, 1997 by Kennedy et al. for a "System and Method for Managing ATP."

TECHNICAL FIELD OF THE INVENTION

This invention relates generally to the field of supply chain planning, and more particularly to a system and method for managing order fulfillment in a distributed supply chain planning environment.

BACKGROUND OF THE INVENTION

Large and complex supply chains are typically managed by multiple planning organizations, each supporting one or more planning engines appropriate for the needs of the organization. For example, one organization might support a supply chain planner (SCP) engine, another might support a factory planner (FP) engine, and another might support yet another type of planning engine. As a result, matching of supply and demand, product allocation, and order promising and fulfillment tasks are likely to be managed using a variety of logically or geographically distributed planning engines. This presents numerous difficulties for customers and suppliers alike.

A lack of detailed visibility into extended supply chain operations often prevents companies from quoting accurate delivery dates and meeting customer orders in a timely manner. Even when there is adequate visibility, a lack of integration between front-end and back-end business objectives may result in lower margin products using up capacity, important market channels receiving worse service than less important market channels, and other sub-optimal commitments. Also, once delivery date and other commitments have been made, it is necessary to monitor the commitments throughout the production and logistics execution process to determine the effect of unexpected supply and demand changes. Accordingly, in a distributed supply chain planning environment, there exists a need for a single and consistent interface to the customer for order promising and fulfillment. The inability to provide such a capability negatively impacts order capture rates, delivery performance, and administrative costs associated with inventory, order processing, and other activities.

Despite numerous attempts in recent years, none have succeeded in creating an effective solution to manage order promising and fulfillment tasks across a network of computers in a distributed supply chain planning environment. While some companies have developed acceptable front-end or "customer-centric" solutions, and others have devoted tremendous energy to achieving suitable back-end supply chain optimization solutions, none have successfully integrated these front-end and back-end solutions to intelligently manage order promising and fulfillment tasks in this environment. As a result, for example, companies routinely over-promise and then lose money attempting to fulfill the commitments they have made, usually with mixed success. To compete effectively in the growing global Internet-based economy, companies must be able to make accurate commitments, aligned with business objectives of the company, and to fulfill their commitments in an efficient and profitable manner.

Furthermore, in such multi-enterprise endeavors, it is often economically or at least politically infeasible to completely re-deploy systems throughout the supply chain. Thus, for a solution system to be routinely deployable in most situations, it must have the ability to accommodate existing systems such that their capabilities are extended while allowing more sophisticated replacement systems to be subsequently introduced. The solution system must ultimately be able to productively co-exist with such existing or replacement systems. Previous techniques for the management of order promising and fulfillment are inadequate to meet these needs.

SUMMARY OF THE INVENTION

According to the present invention, disadvantages and problems associated with supply chain planning and order fulfillment within a distributed network environment have been substantially reduced or eliminated.

According to one embodiment of the present invention, a system for managing available-to-promise (ATP) data includes a client interface and an ATP server interface. A fulfillment server receives a first ATP request using the client interface, the first ATP request including multiple request line-items each corresponding to a desired product. The fulfillment server generates one or more component ATP requests based on the request line-items and communicates the component ATP requests to at least one of multiple ATP servers using the ATP server interface. The fulfillment server receives a plurality of component quotations from the ATP servers using the ATP server interface, each component quotation corresponding to a component ATP request and comprising product availability information for one or more corresponding desired products. The fulfillment server generates a quotation determined according to the product availability information provided by the component quotations and communicates the quotation through the client interface.

According to another embodiment of the present invention, a local fulfillment manager (LFM) has an associated ATP server and operates in a distributed supply chain planning environment including other LFMs. The LFM includes fulfillment server and ATP server interfaces. The LFM receives one or more component ATP requests from a fulfillment server, each component ATP request corresponding to a particular ATP request line-item for a desired product. The LFM determines an ATP response for each request line-item using the associated ATP server and generates a component quotation for each request line-item according to the corresponding ATP response. The component quotations include product availability information for corresponding desired products. The LFM then communicates the component quotations to the fulfillment server for consolidation with other component quotations from one or more other LFMs.

The present invention provides important technical advantages. The fulfillment server and LFMs of the present invention are capable of concurrently and intelligently managing order promising and fulfillment for complex multiple line-item ATP requests from a potentially very large number of clients according to specified user, customer, supplier, and any other business constraints. Where the ATP servers are geographically distributed from one another and the fulfillment server, across the Internet for example, the advantages of the present invention become particularly apparent. Further, where such ATP servers lie in different corporate boundaries, fulfillment server establishes a foundation for order promising and fulfillment capabilities not before possible. The present invention also provides clients a single interface for ATP requests, quotation confirmations, and promise acceptances that may rely on and affect ATP product allocation, material availability, or capacity availability at ATP servers and associated planning engines around the globe. This gives clients highly desirable visibility into extended supply chain operations, among other benefits.

The present invention minimizes the communications necessary between the fulfillment server and the LFMs to maximize bandwidth and minimize latency, which supports its usage in interactive systems (such as Internet web sites that provide online customers instant quotations for multi-item deliveries) and other applications that would not otherwise be possible. The present invention accomplishes this in part by providing clever and flexible placement of computations within the fulfillment server, LFMs, or ATP servers as appropriate, and also by engineering the LFM interface to communicate rich responses that can include numerous options simultaneously. This consistent LFM interface is provided while at the same time supporting a wide variety of ATP servers, including accommodation of existing ATP servers and similar systems not originally designed to support the extended features, operation, and architecture achieved by the present invention.

Moreover, the system architecture of the present invention contemplates that different environments would need to vary where certain computations occur in order to optimize performance as appropriate for the particular application. For example, some applications may need a system with extremely high throughput but can tolerate longer latencies, whereas others may require extremely short latencies but can tolerate less throughput. On the other side, some applications may need to support a huge number of products, while others may need to support huge networks of suppliers for each product, and still others may need large seller networks. The present invention provides adequate flexibility to support such diverse requirements. Other technical advantages will be readily apparent to those skilled in the art from the following figures, description, and claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE DRAWINGS

Figure 1:
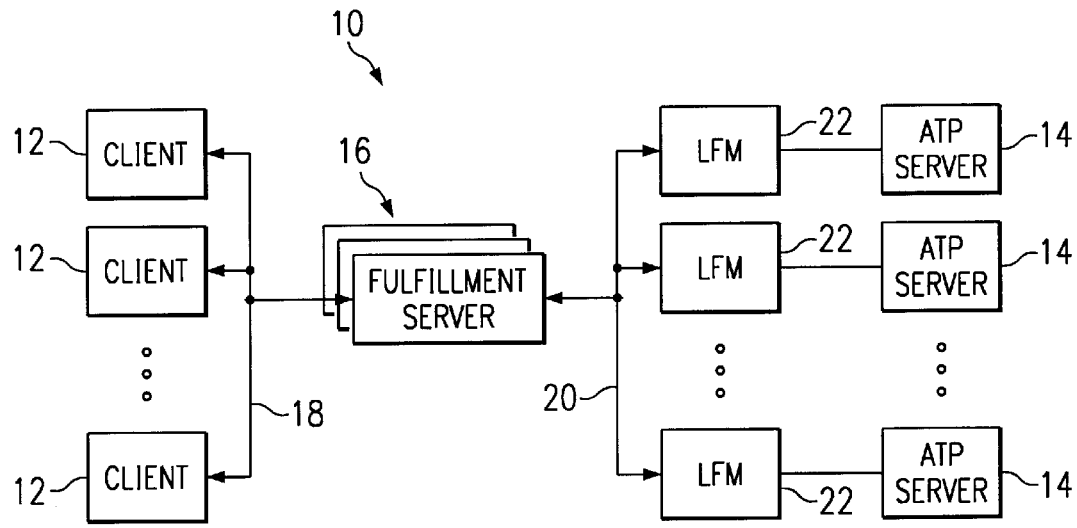
FIG. 1 illustrates an exemplary system for fulfilling commitments within a distributed supply chain planning environment according to the present invention.

FIG. 1 illustrates an exemplary system 10 for fulfilling commitments in a distributed supply chain planning environment. System 10 includes one or more clients 12 representing appropriate Enterprise Resource Planning (ERP) systems, Sales Force Automation (SFA) systems, Order Management Systems (OMS), and any other suitable systems. Each client 12 may be associated with one or more customers, users, or other entities. In a particular embodiment, clients 12 may include sales and customer service oriented applications seeking to augment or replace their existing order promising and fulfillment capability. Clients 12 communicate and interact with fulfillment server 16 using an application-specific integration layer (not explicitly shown), which may include an application programming interface (API), an object request broker (ORB), or another suitable software interface operating at clients 12, fulfillment server 16, or both clients 12 and fulfillment server 16. Network 18 couples clients 12 to fulfillment server 16 and may be a local area network (LAN), a metropolitan area network (MAN), a wide area network (WAN), a global network such as the Internet, or any other suitable network or collection of networks.

Available-to-promise (ATP) servers 14 each support or are associated with a planning engine able to provide, among other things, product availability responses to component ATP requests in the form of component quotations. One or more planning engines associated with ATP servers 14 may also provide pricing and other additional capabilities, as appropriate. A local fulfillment manager (LFM) 22 that is located at or otherwise associated with each ATP server 14 manages the interaction between ATP server 14 and fulfillment server 16. In one embodiment, LFM 22 is a "thin" engine whose primary responsibility within system 10 is to communicate component requests, component quotations, component quotation confirmations, and component promises to and from ATP server 14 in a suitable format, and to monitor their status to the point of order fulfillment. ATP servers 14 provide services to fulfillment server 16 through an application-specific integration layer (not explicitly shown), which may include an API, ORB, or any other suitable software interface operating at ATP servers 14, fulfillment server 16, or both ATP servers 14 and fulfillment server 16. A network 20 coupling fulfillment server 16 to ATP servers 14 and may be a LAN, a MAN, a WAN, a global network such as the Internet, or any other appropriate network or collection of networks integral to or separate from network 18.

In one embodiment, LFMs 22 each provide the same interface and functionality to fulfillment server 16, but may be designed to work with different ATP servers. Many of the ATP servers 14 may be older ATP systems, fulfillment systems, or ERP systems that may be used to compute component quotations, but are not designed to work with fulfillment server 16 in a more comprehensive distributed network environment such as that associated with system 10. Other ATP servers 14 may not even have the ability to provide ATP quotations; rather, they may simply store or support information required to compute the ATP quotations. In still other cases, ATP servers 14 may be designed to work with fulfillment server 16, and as such may have an integrated LFM 22 to directly support the LFM interface of fulfillment server 16.

In each of these cases, LFM 22 is responsible for computing properly formed component quotations or component promises, handling the resulting acceptances, and ensuring that the corresponding material or capacity is indeed reserved. LFM 22 may have to do little but translate information communicated between the LFM interface of fulfillment server 16 and associated ATP server 14. In other situations, where the ATP server 14 is not designed to function as part of a larger system, LFM 22 may need to perform substantial computation or other manipulation of information. LFM 22 may even need to perform some of the ATP functionality if it is interacting with a system that is not designed for ATP, or if interacting with a slower system where the activity of the system needs to be circumvented where possible. The present invention provides for diverse flexibility in LFMs 22 and localizes translation to the more readily deployed LFMs 22 (keeping diverse ATP server variations separated from the computationally heavier and more complex fulfillment server 16).

In general, clients 12 submit ATP requests to fulfillment server 16, each request including one or more line-items pertaining to specific products that each may be ATP at one or more distributed ATP servers 14. Fulfillment server 16 brokers component ATP requests corresponding to these line-items to the appropriate LFMs 22 using the LFM interface and network 20. Each LFM 22 receiving a component ATP request in turn uses associated ATP server 14 to perform necessary computations and record any necessary reservations or changes. LFMs 22 sends resulting component quotations to fulfillment server 16, which manipulates the component quotations as appropriate and presents a unified overall quotation to the requesting client 12, commensurate with the original corresponding ATP request.

Client 12 may generate a quotation confirmation to totally or partially accept the quotation, which fulfillment server 16 manipulates as appropriate and sends to LFMs 22 as component quotation confirmations, each corresponding to a particular component ATP request. LFMs 22, in cooperation with their associated ATP servers 14, generate component promises that consume supply and form binding commitments between the customer and suppliers as to the requested products. Fulfillment server 16 presents a unified promise to client 12, commensurate with the corresponding ATP request, based on the component promises it receives from LFMs 22 and ATP servers 14. Client 12 may generate an acceptance to totally or partially accept the promise, then sending the acceptance to fulfillment server 16. Fulfillment server 16 sends component acceptances to LFMs 22 and LFMs 22 respond to fulfillment server 16 with component acceptance confirmations. Once fulfillment server 16 has sent a unified acceptance confirmation to client 12, based on component acceptance confirmations received from LFMs 22, the order promising and fulfillment cycle is complete. Operation of system 10 is described more fully below.

Clients 12, fulfillment server 16, LFMs 22, and ATP servers 14 may each operate on one or more computers or other suitable processing devices at one or more locations. Each such computer may include an input device, which may be any suitable keypad, touch screen, microphone, or other device to accept information. An output device may convey suitable information, including digital or analog data, visual information, and audio information. The input device and output device may support any suitable fixed or removable storage media, such as magnetic computer diskettes, CD-ROMs, or other media to receive information from and provide information to the computer. One or more processors and an associated volatile or non-volatile memory execute instructions and manipulate information according to the operation of the associated client 12, ATP server 14, LFM 22, or fulfillment server 16, as the case may be. Clients 12, fulfillment server 16, LFMs 22, and ATP servers 14 may be embodied in computer software, in computer hardware, or in any appropriate combination of software and hardware, and may be integral to or separate from one another. To support high availability or other performance requirements, system 10 may incorporate redundant clients 12, fulfillment servers 16, LFMs 22, and ATP servers 14, according to particular needs.

In one embodiment, for each of the LFMs 22 in system 10, fulfillment server 16 may maintain an LFM name, suitable descriptive information for LFM 22, an Internet Protocol (IP) or other network address for LFM 22, the identity of a designated back-up LFM 22 in case LFM 22 fails, and any other suitable information. Fulfillment server 16 may maintain ATP server group and hierarchy information for sourcing purposes. ATP server groups may model, for example, supplier groups, pricing groups, or geographic locations. Since fulfillment server 16 may operate according to both group and supplier sourcing preferences, as described more fully below, it may be desirable to relate one or more suppliers to any applicable ATP server groups. As an example, client 12 or an associated user might specify a preferred supplier, a preferred group, or both, in which case fulfillment server 16 directs component ATP requests to the appropriate LFMs 22 based on these preferences and the supplier-group mappings. Fulfillment server 16 may maintain, for each ATP server group, a group name, suitable descriptive information for the group, a parent group for the group, a list of child groups, a list of LFMs 22 in the group, a list of active suppliers associated with the group, and any other appropriate information. Sourcing preferences may be defined at any level within the ATP server group hierarchy.

A product may represent anything a user associated with client 12 may request, and may be tangible (e.g., a computer) or non-tangible (e.g., a service). Products are related to items, each of which can be related to multiple products. This allows for the modeling of different price points, lead times, suppliers, locations, or any other suitable characteristics for the same item. In addition, multiple items can be related to the same product. This allows, for example, for the modeling of multiple suppliers of the same product. In one embodiment, fulfillment server 16 may maintain, for each product, a product name, a product description, a default unit of measure (UOM), a default lot size or multiple, a cancellation window in which client 12 or an associated user may cancel an order, a customer-ranked, supplier-ranked, or other list of alternates or substitutes for the product, supplier-defined related products, locations for the product, active suppliers for the product, attribute types for the product such as style, size, and color, or any other appropriate product information. Fulfillment server 16 may also maintain information about attributes, separate from any particular product, such as attribute type, description, value range, UOM, particular attributes within an attribute type, and any other suitable attribute information.

Fulfillment server 16 may maintain sales channels (customers) and parent-child or other hierarchical relationships between sales channels, which fulfillment server 16 may use for order promising and other suitable purposes, as discussed more fully below. In one embodiment, definitions for each sales channel maintained at fulfillment server 16 include, in any combination and without limitation: (1) name, (2) description, (3) category, (4) parent, (5) children, (6) ranked or other list of groups fulfillment server 16 may use in determining product sourcing, (7) products customer has or may order, (8) ranked or other list of groups for given product, (9) ranked or other list of suppliers for each product, (10) whether customer accepts alternate or substitute products generally or for given product, (11) ranked or other list of alternate or substitutes for each product, (12) whether customer accepts alternate sourcing groups generally or for given product, (13) target or mandatory price limit or price range for each product, (14) whether the customer prefers only full shipments generally or for given product, (15) whether the customer prefers unfulfilled portions of requests to be canceled rather than carried as backlog generally or for given product, (16) whether the customer prefers only on-time shipments generally or for a given product such that early or late promises are rejected, (17) delivery window outside of which a late or early shipment is not acceptable, (18) required lot size or multiple for given product such that quotations are rounded based on this value, and (19) whether customer generally prefers that if request line-item is shorted then logically associated request line-items are shorted proportionally.

In general, allocation information may be held at any level of a sales channel or other hierarchy and may be as deep as necessary. Fulfillment server 16 may process request line-items through alternate groups or suppliers if a primary group or supplier is unable to service a request. Within a preferred group, supplier preferences are honored if they are defined. Lists of alternates or substitutes should generally not be restrictive, such that if an acceptable quotation response is not available from a preferred supplier, fulfillment server 16 may locate product allocation or materials or capacity availability from other potential suppliers. For requests that do not explicitly disallow alternates or substitutes, and do not specify customer-preferred alternates, the supplier may be able to respond with its own selection of alternates or substitutes.

Fulfillment server 16 may maintain information regarding suppliers and parent-child or other hierarchical relationships between suppliers, which fulfillment server 16 may use for order promising and other suitable purposes, as discussed more fully below. In one embodiment, definitions for suppliers maintained at fulfillment server 16 may include, in any suitable combination, without limitation: (1) name, (2) description, (3) category, (4) parent, (5) children, (6) the products the supplier provides, (7) the groups associated with the supplier, (8) ranked or other list of preferred customers for a given product, (9) acceptable alternates or substitutes for a given product, (10) minimum and maximum quantities for orders, (11) order quantity constraint not allowing fulfillment server 16 to reduce the quotation quantity without affecting validity of quotation, (12) cancellation restrictions, and (13) cancellation window outside of which orders cannot be canceled.

Fulfillment server 16 uses business constraints described above, which it may have previously stored, may receive within ATP requests from clients 12, or both, to source request line-items to particular LFMs 22 or to filter out any component quotation and component promise responses from LFMs 22 that do not satisfy these constraints. For example, if a supplier provides multiple alternative responses, or responses from alternative groups, fulfillment server 16 may filter out non-compliant responses or responses from unacceptable groups. If none of the alternatives comply, fulfillment server 16 may reject the response in whole. The existence of a list of alternates or alternate groups does not mean they will be used. In one embodiment, client 12 or an associated user may selectively override some or all of these business constraints when generating ATP requests, quotation confirmations, and promise acceptances, according to particular needs.

In one embodiment, fulfillment server 16 supports a hierarchy of one or more sellers of products and each LFM 22 supports the same hierarchy of sellers but with a subset of the products supported by fulfillment server 16. LFMs 22 compute component quotations or component promises based on allocations throughout the seller hierarchy for the corresponding products. These capabilities are described in copending U.S. application Ser. No. 08/491,167, filed Jun. 16, 1995 by Kennedy et al. for a "System and Method for Managing Available to Promise (ATP)," and copending U.S. application Ser. No. 08/802,434, filed Feb. 18, 1997 by Kennedy et al. for a "System and Method for Managing ATP," both of which are incorporated by reference herein. As a result, system 10 provides the ability to distribute product allocations to LFMs 22 and associated ATP servers 14 on a product by product basis, thereby gaining both space and time scalability in systems with large numbers of products.

Fulfillment server 16 may support one or more hierarchies of related or generic products, as described in U.S. application Ser. No. 08/802,434. LFMs 22 may support one or more subsets of the same hierarchies and may compute component quotations or component promises based on the allocations to the products in those sub-hierarchies. This provides additional technical advantages in applications where products are related by hierarchies.

One or more fulfillment servers 16 may work cooperatively, independently, or otherwise with the same set of LFMs 22. Each such LFM 22 may accept component ATP requests and component quotation confirmations from multiple fulfillment servers 16 and may send component quotations or component promises to multiple fulfillment servers 16. This offers numerous technical advantages, including the ability to scale the system to handle larger numbers of clients or larger numbers of ATP requests 30. In addition, this capability allows for the geographical or organizational distribution of fulfillment servers 16 according to particular needs.

Each fulfillment server 16 may enforce different business constraints, depending on the set of clients 12 each fulfillment server 16 supports. Each fulfillment server 16 may work with different sets of LFMs 22, where each LFM 22 may belong to one or more of the LFM sets corresponding to fulfillment server 16. Each fulfillment server 16 may also support its own supply or allocations for one or more of products. This offers numerous additional technical advantages, including significant flexibility in setting up distributed ATP systems with fulfillment servers 16 tailored and optimized to support a variety of clients 12. Moreover, these options facilitate setting up local allocations of product supply at fulfillment servers 16 to reduce latency and increase throughput for requests of common products.

Each fulfillment server 16 may have the capability to operate as an LFM 22. In one embodiment, each fulfillment server 16 will at least be an adequate ATP server 14 to support a separate LFM 22. In either situation, it is possible to form a hierarchy of LFMs 22 by using a first system, including a first fulfillment server 16, corresponding LFMs 22, and their associated ATP servers 14, as ATP server 14 within a second system that includes a second fulfillment server 16, corresponding LFMs 22, and the associated ATP servers. In this way, a hierarchy of LFMs 22 and ATP servers 14 of appropriate breadth and depth can be formed according to particular needs. The present invention contemplates any suitable relationship between one or more LFMs 22 and one or more fulfillment servers 16.

Such hierarchical organization facilitates numerous additional system designs and offers numerous additional technical advantages. For example, each LFM 22 in such a hierarchy may be assigned one or more products to handle, where the products are part of a hierarchy of related or generic products. In that case, the LFMs 22 may compute availability of the generics of an assigned product by sending component ATP requests 32 to the particular LFM 22 that corresponds to the generic products, providing further parallelization and scalability.

Also described in U.S. application Ser. Nos. 08/491,167 and 08/802,434, fulfillment server 16 may support a hierarchy of one or more sellers of products and each LFM 22 may correspond to a particular one of those sellers. LFM 22 may hold allocations of supply for its associated seller and compute all component quotations and component promises possible with allocations it contains. Fulfillment server 16 receives these component quotations or component promises and combines them for each product as if ATP request 30 had been quoted or promised by a single system having all of the allocations. As a result, system 10 provides the ability to distribute product allocations to LFMs 22 and associated ATP servers 14 on a seller by seller basis, thereby gaining both space and time scalability in applications with large numbers of sellers or gaining flexibility in applications where seller organizations are geographically or economically separated. Each LFM 22 may compute availability for its parent seller by sending one or more component ATP requests 32 to the LFM 22 corresponding to the parent seller. Furthermore, multiple LFMs 22 may hold separate allocations for a particular product and fulfillment server 16 may distribute quoting activity across such LFMs 22 as needed to obtain adequate quotes. These and other features of system 10 provide or otherwise allow for advantageous parallelization, scalability, throughput, as well as distributed deployment of seller systems.

To achieve even further scalability, further breakdowns can be made. In one embodiment, a first fulfillment server 16 can work with LFMs 22 that each are assigned or otherwise correspond to a one or more designated products. Each such LFM 22 can in turn use an ATP server 14 that is a second fulfillment server 16 backed by separate LFMs 22 that have each been allocated a portion of the overall supply allocation for a designated product. The second fulfillment server 16 can be designed to communicate to its LFMs 22 so as to minimize and balance the processing load placed upon each of those LFMs 22. Alternatively, the various LFMs 22 may be given different time slices of the horizon to handle, and component quotations 34 may be broken down and staged accordingly. This may increase latency to optimize scalability with respect to size and throughput.

In one embodiment, the components of system 10 use a protocol referred to as "Request-Promise-Accept" (RPA) in creating, managing, and fulfilling ATP requests relating to products. In general, according to the RPA protocol, a customer requests one or more products and a supplier offers a promise that meets the requirements of the customer request as closely as possible. Upon reviewing the offered commitment from the supplier, the customer either accepts or rejects the promise. If the customer accepts the promise, both customer and supplier generally consider this acceptance to form a binding agreement. In certain situations, a customer cannot freely cancel an acceptance within a specified time interval because of this commitment. The RPA protocol was developed as the basis for managing supply and demand requests between autonomous planning domains of a distributed supply chain as part of the RHYTHM supply chain planner (SCP) engine from I2 TECHNOLOGIES, INC.

FIGS. 2 through 5 illustrate the operation of system 10 through a series of workflows. These and other described workflows involve an interactive scenario with full use of the extended RPA protocol according to the present invention. However, not all possible workflows are interactive and not all result in full use of the extended RPA protocol. For example only and not by way of limitation, large companies may often process the bulk of their customer orders using Electronic Data Interchange (EDI) based techniques, in which an ATP request results in an ATP-consuming promise without further customer interaction. Those skilled in the art will appreciate that system 10 accommodates EDI-based and other suitable workflows, and that the present invention is intended to encompass all such workflows and associated operations.

ATP Request Workflow

Figure 2:
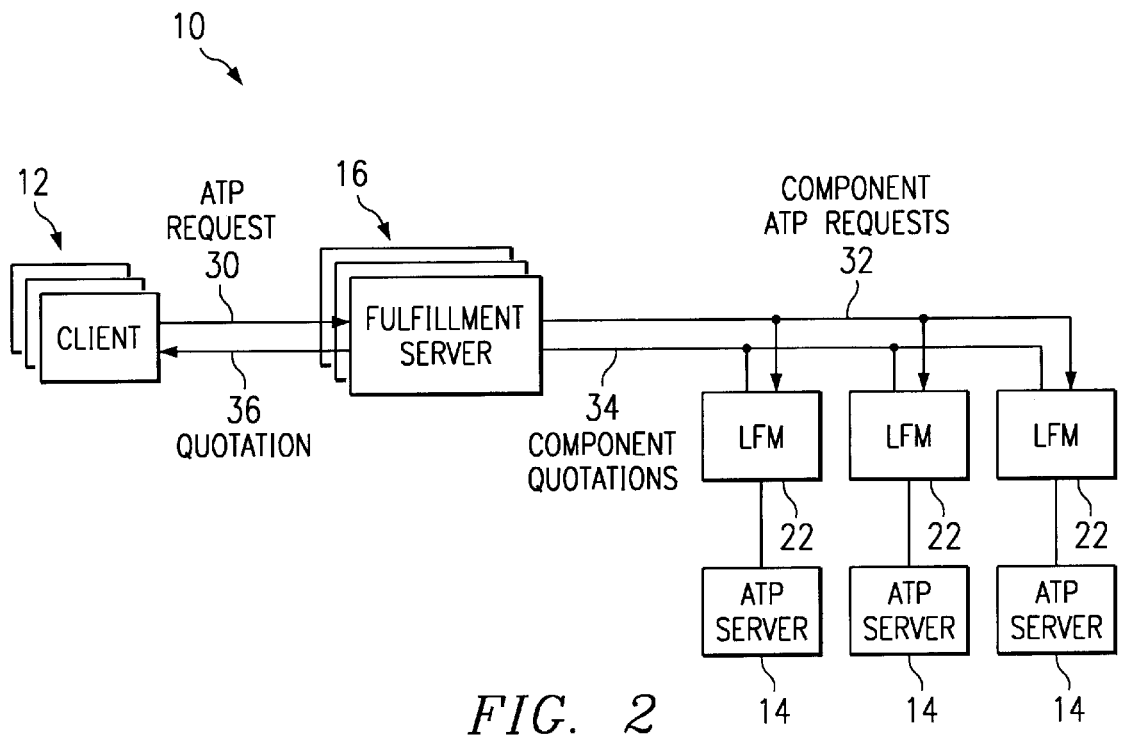
FIG. 2 illustrates an exemplary ATP request workflow according to the present invention.

FIG. 2 illustrates an exemplary ATP request workflow in which a multiple line-item ATP request 30 is created at client 12, client 12 submits ATP request 30 to fulfillment server 16, and fulfillment server 16 brokers ATP request 30 against one or more LFMs 22 in the form of component ATP requests 32. These LFMs 22 process component ATP requests 32 in cooperation with associated ATP servers 14, generate resulting component quotations 34, and send the component quotations 34 to fulfillment server 16. Fulfillment server 16 processes the component quotations 34 and generates a unified quotation 36, which is sent to client 12 for review.

Initiate ATP Request [Client]

In one embodiment, to initiate ATP request 30, client 12 or an associated user may be required to provide appropriate identification and security information. Client 12 may support default business rules or other constraints according to a user profile, a customer profile, or other suitable definitions. When the user accesses an ATP request screen associated with client 12, the screen may be populated with default parameters according to such definitions. The user may then optionally adjust some or all of these parameters to suit the needs of the particular ATP request 30. Such parameters may include shipping requirements, preferences with respect to product sourcing, product alternates or substitutions, and ship-to location, price targets, and any other appropriate parameters. The user may select from a table of available products, organized according to product group or in another suitable manner, using a product catalog, search engine, or otherwise. Once the user selects one or more products, the user may specify desired quantities, desired due dates, and any additional parameters such as those discussed above. The user may also logically group request line-items for shipment scheduling purposes. Client 12 executes an ATP request submission function when ATP request 30 is completely specified, sending ATP request 30 to fulfillment server 16.

ATP request 30 may be structured in a three-level parent-child hierarchy that includes a request object, a request line-item object, and a request line-item delivery object, although any suitable data or message structure may be used without departing from the intended scope of the present invention. As an example, an alternative three-level structure for ATP request 30 might include a request object that contains a list of one or more request delivery objects, each containing one or more request line-item objects.

Request Attributes

In one embodiment, the request object has the following attributes or otherwise supports the following information, in any suitable combination and without limitation: (1) user ID—user of client 12 submitting the request; (2) customer ID—used to determine business constraints relevant to request; (3) customer request ID—assigned at client 12 and used primarily for tracking purposes; (4) request ID-assigned at fulfillment server 16 and used for subsequent processing and administrative activities; (5) currency—the preferred currency for request, possibly defaulted from profiled business constraints; (6) sales channel (seller)—sales channel for request, useful where ATP servers 14 provide allocation functionality based on a multi-level channel hierarchy and seller determines channel from which to consume ATP; (7) request rank—numeric or other ranking of request relative to other requests for same product, useful as sort criterion where ATP servers 14 provide functionality relative to differential ranking of requests within order scheduling process, such as when allocating scarce supply in light of supply problems; (8) ship-to—ship-to location for request, which may default to each request line-item; (9) override customer constraints—allows user to override business constraint processing functionality of fulfillment server 16 such that the responses from LFMs 22 are not constrained; (10) total price target—user-specified total price target for request, which fulfillment server 16 may consider in evaluating the responses from LFMs 22 and, if not met, may indicate in resulting quotation; (11) alternates/substitutes allowed logical (yes/no) parameter defaulted from profiled business constraints, which user may be able to selectively override and fulfillment server 16 may use in processing request; (12) alternate location acceptable—logical parameter defaulted from the profiled business constraints, which user may be able to selectively override and fulfillment server 16 may use in processing request; (13) ship complete—logical parameter defaulted from profiled business constraints, which the user may be able to selectively override and fulfillment server 16 may use in processing request such that component quotations short of the request quantity attribute are rejected; (14) partial/cancel—logical parameter defaulted from profiled business constraints, which user may be able to selectively override and fulfillment server 16 may use in processing request such that late promises (unfulfilled portions of request) are either dropped or carried as backlog; (15) ship on-time—logical parameter defaulted from profiled business constraints, which the user may be able to selectively override and fulfillment server may use in processing request according to whether it is acceptable to receive early or late component promises from LFMs 22; (16) short proportional logical parameter defaulted from the profiled business constraints, which user may be able to selectively override and fulfillment server 16 may use in processing request such that promises among logically associated request line-items are reduced (shorted) in proportion in to another shorted request line-item; (17) initial date requested—date request first submitted to fulfillment server 16 for quotation; (18) last date requested—date request last submitted to fulfillment server 16 for re-quotation, if any; (19) date quoted—date request last quoted, if any; (20) date accepted—date client 12 last accepted request, if any; (21) date rejected—date client 12 last rejected request in full, if any; (22) date promised—date request last promised, if any; (23) date canceled—date request canceled, if any; and (24) date queued—date request last queued, if any.

In addition, the request object may support a request status field that fulfillment server 16 updates at certain milestones during the life of ATP request 30, including but not limited to: (1) "failed request"—request submitted for initial quotation or re-quote, but one or more request line-items do not meet requirements; (2) "pending quotation"—request submitted for initial quotation or re-quoted, but resulting quotation yet to be processed; (3) "failed quotation"—fulfillment server 16 determined quotation failed to meet profiled business constraints for request; (4) "pending acceptance"—fulfillment server 16 processed quotation and sent it to client 12, but client 12 yet to respond; (5) "acceptance not received"—quotation confirmation not received from client 12 by date and time specified in accept-by attribute, such that quotation essentially null and void; (6) "rejected"—fulfillment server 16 processed a rejection and sent it to LFMs 22; (7) "pending promise" fulfillment server 16 processed quotation confirmation, sent it to LFMs 22, and is now monitoring for component promise responses from LFMs 22; (8) "promised" fulfillment server 16 received component promises and has sent resulting promise to client 12; (9) "failed promise"—fulfillment server 16 has not yet received component promises from LFMs 22 and has thus sent failure notification to client 12; (10) "pending cancellation"—fulfillment server 16 processed a cancellation, sent it to LFMs 22, and is monitoring confirmation responses from LFMs 22; (11) "canceled" fulfillment server 16 received requisite cancellation confirmations from LFMs 22 and sent confirmation to client 12; and (12) "queued"—fulfillment server 16 processed a request queue command and is monitoring the request for re-quotation.

Request Line-Item Attributes

In one embodiment, the request line-item is an object having the following attributes or otherwise supporting the following information, in any combination and without limitation: (1) request ID—links request line-item to request; (2) request line-item ID—assigned at fulfillment server 16; (3) ship-to—default ship-to address for request line-item, which is defaulted from request, user may be able to selectively override, and is defaulted to request line-item delivery; (4) accept by—date and time by which user must accept quotation; (5) promise by—date and time by which fulfillment server 16 must respond with promise; (6) product ID—requested product for the request line-item; (7) product UOM—primary unit of measure (UOM) for the requested product; (8) request quantity—quantity or quantity range of product requested, which must equal combined delivery quantities if multiple request line-item deliveries are defined; (9) request date—date or date range product is required to arrive at customer ship-to location, which user may override if there are multiple request line-item deliveries for the request line-item; (10) category/attribute category/attribute combinations for the requested product; (11) line-item grouping relates multiple request line-items as logical grouping for delivery coordination, where grouping may represent configuration, bundled package of products, set of items that must ship together, or any other suitable grouping; (12) line-item price target—user-specified target price for request line-item, which fulfillment server may consider when evaluating ATP server responses and, if not met, may indicate in the resulting quotation; (13) preferred product/supplier—defaulted from profiled business constraints, which user may be able to selectively override and fulfillment server 16 uses when sourcing request line-item; (14) alternates/substitutes allowed—defaulted from profiled business constraints, which user may be able to selectively override and which fulfillment server 16 may use to process request line-item; (15) preferred alternates/substitutes—defaulted from profiled business constraints, which user may be able to selectively override and which may allow fulfillment server 16 and supplier to cooperate in selecting available alternates or substitutes for requested product; (16) mandatory—whether request line-item is mandatory relative to others in its grouping, such that insufficient quantities of a mandatory item may result in a failed quotation; (17) lot size/multiple—defaulted from basic product definition, which user may be able to selectively override and fulfillment server 16 may use in processing request line-item such that ATP server response quantities are rounded accordingly; (18) ship complete—defaulted from the profiled business constraints, which the user may be able to selectively override and fulfillment server 16 may use in processing request line-item; (19) partial/cancel—defaulted from profiled business constraints, which user may be able to selectively override and fulfillment server 16 may use in processing request line-item such that it may be dropped if not completely fulfilled; (20) ship on-time—defaulted from profiled business constraints, which the user may be able to selectively override and fulfillment server 16 may use in processing the request line-item to reject late or early promises; (21) LFM response status fulfillment server 16 monitors after brokering component ATP request to LFMs 22, such that when all the component quotations have been received fulfillment server 16 may begin evaluating quotation; (22) LFM-initiated event status—maintained at fulfillment server 16, such that if a planning event affects supply, LFM 22 notes this and informs fulfillment server 16 so that fulfillment server 16 may re-evaluate status of request relative to profiled business constraints and notify user of any change in request status; and (23) request line-item status—updated at certain milestones in the life cycle of the request line-item.

Request Line-Item Delivery Attributes

In one embodiment, the request line-item delivery is an object having the following attributes or otherwise supporting the following information, in any suitable combination and without limitation: (1) request line-item ID—links request line-item delivery to request line-item; (2) request line-item delivery ID—assigned at fulfillment server 16; (3) ship-to—default ship-to address for the request line-item delivery, which is defaulted from request line-item and user may selectively override; (4) request quantity—quantity or quantity range of product requested, which must equal request line-item request quantity; (5) request date—date or date range product is required to arrive at the customer ship-to location for the request line-item delivery, which user may be able to override if there are multiple request line-item deliveries for a request line-item; and (6) category/attribute—category—attribute combinations for the request line-item delivery, which the user may be able to selectively override if there are multiple request line-item deliveries for a given request line-item.

Process ATP Request [Fulfillment Server]

Each of the line-items associated with ATP request 30 may be fulfilled from a logically or geographically distinct ATP server 14. In this workflow, the primary tasks of fulfillment server 16 are to decompose ATP request 30 into individual request line-items, broker resulting component ATP requests 32 against the distributed network of ATP servers 14 using network 20 and LFMs 22, evaluate component quotations 34 received from LFMs 22, and send a unified quotation 36 to client 12 using network 18. If multiple deliveries have been specified for a given request line-item, fulfillment server 16 creates a separate component ATP request 32 for each delivery. Some or all component ATP requests 32 may be pre-sourced to particular LFMs 22 according to customer business constraints, user preferences, or supplier-preferred sourcing rules. In the alternative, sourcing preferences may be unspecified, such that multiple LFMs 22 have an opportunity to provide quotation responses. In one embodiment, fulfillment server 16 decomposes and encapsulates customer and other suitable business constraints into component ATP requests 32 before sending them to LFMs 22.

For each product, a supplier may specify minimum and maximum order quantity requirements. In one embodiment, if the parameters of such requirements have been specified, fulfillment server 16 evaluates at the outset whether each request line-item meets such requirements. If any request line-items do not meet specified requirements, a failure response is generated and sent to the requesting client 12 using network 18. In this case, fulfillment server 16 update the status of ATP request 30 and possibly of the failed component ATP requests 32 to "failed request."

Fulfillment server 16 may attempt to define the sourcing for each request line-item according to supplier or location. Fulfillment server 16 may then specifically target the component ATP requests 32 to particular LFMs 22. Because the user may have overridden profiled default constraints, fulfillment server 16 first evaluates the request line-item and request line-item delivery details, then checks the alternate supplier and location sourcing attributes to determine whether alternates are allowed for ATP request 30. If alternates are not allowed, then the primary relationship specified in ATP request 30 will be honored. If alternate sourcing is allowed, then the user, customer, or other alternate sourcing preferences take precedence. If no such sourcing preferences have been specified, fulfillment server 16 may check for the existence of any supplier default preferences. If no specified preferences exist for the supplier either, component ATP requests 32 may be marked "unspecified" relative to the target LFM 22. In this case, multiple LFMs 22 may be allowed to service and respond to component ATP requests 32 as appropriate.

Fulfillment server 16 may attempt to define alternate or substitution preferences for ATP request 30. Fulfillment server 16 may include alternate product information in component ATP requests 32. Since the user may have selectively overridden profiled default constraints, fulfillment server 16 first evaluates request line-item and request line-item delivery details, then checks ATP request 30 to determine whether alternates or substitutions are allowed. If not allowed, then the primary relationship specified in ATP request 30 are honored. If alternate or substitute products are allowed, then user, customer, or other suitable alternate or substitution preferences take precedence. If no such preferences are specified, fulfillment server 16 may check for any supplier default preferences. If no specified preferences exist for the supplier either, component ATP requests 32 may be marked as "unspecified" relative to alternates and substitutions. In this case, LFMs 22 may respond to component ATP requests 32 with multiple product options.

Fulfillment server 16 generates the component ATP requests 32 with embedded business constraints. Since the user may have interactively overridden profiled default constraints, fulfillment server 16 uses request line-item and request line-item delivery details for defining attributes of component ATP request 32. In one embodiment, the following constraints are defined, in any suitable combination and without limitation: request quantity, ship complete, partial/cancel, ship on-time, alternates/substitutes allowed, preferred alternates/substitutes, lot size/multiples, and consume forward/backward boundaries. Fulfillment server 16 may also indicate that component ATP request 32 is to be further constrained in some manner according to profiled business constraints. Once component ATP requests 32 have been generated, fulfillment server 16 sends the component ATP requests 32 to one or more LFMs 22 for servicing using network 20. Fulfillment server 16 may also update the status of ATP request 30 and possibly component ATP requests 32 to "pending quotation."

In one embodiment, fulfillment server 16 computes or otherwise generates a sequence of component ATP requests 32 that it sends to a particular LFM 22 associated with a first component ATP request 32 in the sequence. The target LFM 22 accepts the sequence, processes the component ATP request 32 specifically targeted to it, and then passes resulting component quotations or component promises, along with remaining component ATP requests 32 in the sequence, to LFM 22 targeted by the next component ATP request 32. In turn, that LFM 22 accepts the sequence, processes the component ATP requests 32 specifically targeted to it, and passes resulting component quotations or component promises, along with any remaining component ATP requests 32 in the sequence, to the LFM 22 targeted by the next component ATP request 32. Each such LFM 22 may compute its component quotations or component promises such that they satisfy all suitable business constraints relative to component quotations or component promises made by other LFMs 22 earlier in the sequence. Fulfillment server 16 receives the sequence of resultant component quotations or component promises from the last such LFM 22 and generates a combined quotation or promise corresponding to the ATP request 20 from client 12.

Component ATP Request Attributes

In one embodiment, component ATP request 32 is an object having some or all attributes of the request line-item and request line-item delivery objects. Fulfillment server 16 embeds business constraints into the component request that are relevant to functions of LFMs 22. The component request may have the following attributes or may otherwise support the following information, in any suitable combination and without limitation: (1) component request ID—assigned at fulfillment server 16 when it creates component request; (2) LFMID—target LFM 22 for component request, which may remain unspecified where sourcing relationship is not specified or derived at fulfillment server 16 and in which case any LFM 22 is free to respond to the component request if it can meet requirements; (3) fulfillment server ID—network address or other identifier for fulfillment server 16, useful in environment having multiple fulfillment servers 16; (4) sales channel (seller) for component request; (5) request rank for parent request; (6) request line-item ID links component request to request line-item; (7) request line-item delivery ID; (8) product ID—may correspond to product ID known to one or more target LFMs 22 and possibly the corresponding ATP servers 14; (9) product UOM—may correspond to product UOM used at one or more target LFMs 22 and possibly the corresponding ATP servers 14; (10) request quantity; (11) request date; (12) category/attributes; (13) ship complete; (14) partial/cancel; (15) ship on-time; (16) lot size/multiples; (17) alternates/substitutes allowed; (18) preferred alternates/substitutes; and (19) consume forward/backward boundaries—defines delivery window the customer is willing to accept, which may control how far forward or backward from the request date ATP servers 14 will search for available quantities.

In addition, the component request object may support a request status field that fulfillment server 16 updates at certain milestones in the life cycle of the component request, including but not limited to: (1) "pending quotation"—component request has been submitted for initial quotation or re-quoted, but resulting quotation not processed; (2) "failed quotation"—fulfillment server 16 determined component quotation failed to meet requirements for the component request; (3) "pending quotation confirmation"—fulfillment server 16 has processed quotation and transmitted it to client 12, which has yet to respond; (4) "confirmation not received" confirmation not received from client 12 by date and time specified in accept-by attribute, such that the quotation is essentially null and void; (5) "rejected" fulfillment server 16 has processed rejection and sent it to LFMs 22; (6) "pending promise"—fulfillment server 16 has processed the quotation confirmation, sent it to the LFMs 22 as component confirmations, and is monitoring promise responses; (7) "promised"—fulfillment server 16 received requisite component promises and sent the resulting promise to client 12; (8) "failed promise"—fulfillment server 16 has not received requisite component promises and has sent resulting failure notification to client 12; (9) "pending cancellation"—fulfillment server 16 processed a cancellation, sent it to LFMs 22, and is monitoring confirmation responses; and (10) "canceled" fulfillment server 16 received component cancellation confirmations from LFMs 22 and sent cancellation confirmation to client 12.

Process Component ATP Requests [LFM]

Component ATP requests 32 from fulfillment server 16 are received at each of the appropriate LFMs 22. As discussed above, an LFM 22 is generally responsible for managing component ATP requests 32 and communicating between fulfillment server 16 and associated ATP server 14 over the life of ATP request 30. In one embodiment, LFM 22 is involved in quotation, promise, acceptance, shipping, and archive operations for associated ATP server 14. If specified sourcing preferences exist, component ATP requests 32 may include this information, such that LFMs 22 may identify and process component ATP requests 32 accordingly. If there are no specified sourcing preferences, LFMs 22 may be capable of identifying relevant component ATP requests 32 based on the user, customer, or product. At a particular ATP server location, LFM 22 receives component ATP request 32 and generates a quotation request to ATP server 14 using the command syntax suitable for the particular associated planning engine. As part of this processing, LFM 22 evaluates the business constraints encapsulated in component ATP request 32 and acts accordingly.

Planning engines may vary relative to the requirements of this interface. As an example, FP engines typically do not maintain ATP from which request transactions will consume allocated product availability. Each component request is planned against a representation of finished goods inventory, available materials or capacity, and other suitable factors to determine product availability. There may be little functionality for controlling the output structure of the resulting quotation response from the standpoint of shipment timing and lot sizing. In this situation, LFM 22 may submit the quotation request as a planning transaction and evaluate the quotation response according to the business constraints encapsulated in component ATP request 32. If the response from ATP server 14 does not meet these requirements, LFM 22 identifies this and sends a failure notification to fulfillment server 16.

For example, if the ship complete attribute within component ATP request 32 requires the request to be met in full, and the quotation response from ATP server 14 was less than the requested quantity attribute, then LFM 22 might indicate the component quotation 34 as having failed and provide an appropriate descriptive failure annotation. This front-line evaluation may be important since, depending on the planning engine, the ATP server response may be multi-dimensional (offering multiple options). Providing response evaluation at the LFM level rather than at the fulfillment server level allows failure conditions to be identified and summarized before component quotations 34 are sent back to fulfillment server 16, thereby reducing overall network load.

As an example of a multi-dimensional ATP server response, consider a given request line item (e.g., 100 wheels on May 8), for which the response might be that 60 wheels are available on May 8 for $22, and/or 30 wheels on May 10 for $16, and/or 100 wheels on May 12 for $16. These are multiple options for the line-item quote. System 10 may allow for the incorporation of rules and ranges. For example, the ability to take 30 wheels on May 10 and the remaining 70 wheels on May 12 may be constrained if the option for $16 on May 12 includes a quantity restriction inconsistent with this.

As a further example, consider a three line-item request (e.g., 100 wheels, 25 simple axles, and 25 complex axles delivered proportionally on May 8). Individual line-item quotes can be computed as above, with multiple options, then combined in some suitable manner. For example, the simple axles might be available on May 9, 15 units, and May 11, 25 units, for $10. The complex axles might be available on May 8, 10 units, and May 10, 25 units, for $25. Ignoring the proportionality business constraint included in the request, delivery of products satisfying the order might occur over several days, May 8 through May 12, as appropriate. A proportionality business constraint, however, might mandate that line-items only be delivered in amounts proportional to how they were requested, since for example it may do no good to be delivered wheels if no axles are delivered. The above might result in the following exemplary multi-dimensional quote that includes multiple line-item quotes and obeys an exemplary proportionality business constraint:

May 9—40 wheels, 10 of each axle, for $(22*40+10*10+25*10)

May 10–28 wheels, 7 of each axle, for $(16*28+10*7+25*7)

May 10–60 wheels, 15 of each axle, for $(16*30+22*30+10*15+25*15)

May 11–88 wheels, 22 of each axle, for $(16*30+22*58+10*22+25*22)

May 12–100 wheels, 25 of each axle, for $(16*100+10*25+25*25)

In one embodiment, system 10 supports many different business constraints, some of which may need one or more extra fields to be specified. To model this, the business constraint field could be an extension selector, as described in U.S. Pat. Nos. 5,764,543 and 5,930,156, both of which are incorporated by reference herein. Additional extension fields might become operative when a corresponding extension value is inserted into the extension selector field. For example only and not by way of limitation, a maximum variance constraint might be specified on ATP request 30 and an additional field added to the request model called max_variance_percentage that allows the client 12 or an associated user to specify the amount of variance from a requested quantity that will be tolerated. That field may not exist and may not take up any memory space when the maximum variance constraint is not specified. System 10 may allow such an extensible model or capability to be used with respect to any or all business constraints described herein, providing significant flexibility and an important technical advantage over flat or other previous modeling techniques.

Within system 10, various LFMs 22 may compute a variety of partial quotations or partial promises, for example, containing no detail of supply availability. When this occurs, fulfillment server 16 may be tasked with creating a combined promise using the partial quote information. Worse, since the LFMs 22 may be backed by inferior ATP servers 14 incapable of providing suitably rich ATP information, fulfillment server 16 may need to deal with a varied sophistication of component quotations or component promises and still form the best possible quotations or promises for ATP request 30 as a whole. Performing this task properly may require any number of business constraints to drive the interpretation of the various component quotations or component promises, or to mutate the various component quotations or component promises as appropriate. Extensibility within the models representing LFMs 22 allows different constraints for mutating component quotations or component promises to be modeled. The present invention contemplates extensibility with respect to any suitable business constraints described herein.

In contrast to the FP engine situation, where ATP server 14 is associated with an SCP engine there is usually significant representation relative to allocations as well as, for example, order timing and lot sizing constraints. As a result, LFM 22 is able to pass these constraints along from component ATP request 32 to ATP server 14. In particular with respect to SCP engines, LFM 22 may need to distinguish between quotation and promise workflows since the initial quotation request to ATP server 14 may be only an inquiry that does not consume any allocated product or available material or capacity. Resulting quotation responses are sent from ATP server 14 back to LFM 22. In EDI-based exchanges, however, a quotation request to ATP server 14 may actually result in an ATP-consuming promise.

LFM 22 evaluates the quotation response from ATP server 14 according to the business constraints encapsulated in the originating component ATP request 32. Once again, the processing requirements of this evaluation depend on the sophistication of the planning engine associated with ATP server 14. With an SCP engine, this quotation response may encompass the business constraints such that processing responsibility of LFM 22 is limited. In the case of an FP engine, however, LFM 22 may need to closely evaluate the quotation response before a component quotation 34 is generated. ATP server 14 may be capable of returning one or more quotation responses, each of which must be evaluated relative to the applicable business constraints.

After evaluating quotation responses from ATP servers 14, LFM 22 computes a component quotation 34 that includes product availability information and rules on how fulfillment server 16 may mutate component quotation 34. LFM 22 sends component quotation 34 back to fulfillment server 16. If multiple quotation responses are deemed valid according to the constraints, LFM 22 generates and sends multiple component quotations 34 back to fulfillment server 16. If component ATP request 32 fails to yield a valid component quotation 34, LFM 22 may send an annotated failure notification to fulfillment server 16. Such failure notifications may include, for example, "insufficient product quantities" or "unable to meet shipment delivery or lot sizing requirements." As described below, fulfillment server 16 mutates component quotations 34, in accordance with the information and rules they provide, such that together component quotations 34 satisfy the business constraints applied at fulfillment server 16 or asserted along with ATP request 30.

Component Quotation Attributes

In one embodiment, each component quotation is an object with the following attributes or supporting the following information, in any appropriate combination and without limitation: (1) component quotation ID—assigned at LFM 22 when it creates the component quotation; (2) component request ID; (3) fulfillment server ID; (4) product ID—may not directly correspond to product specified in component request since an alternate or substitute may have been specified; (5) product UOM may not correspond to one specified in component request since ATP server 14 may have responded in a different UOM than that requested; (6) promise quantity quantity of product for the component quotation delivery; (7) promise date—date product delivery is promised to ship by ATP server 14, which represents shipment from manufacturing or distribution location rather than customer delivery date; (8) promise lot; (9) promise attributes—list of category/attribute combinations for component quotation; (10) promise type—type of response, which LFM 22 updates (e.g., "as requested," "alternate/substitute," "option"); (11) unit price—unit price for product in base currency of ATP server 14; (12) quotation status—LFM 22 updates, indicating whether quotation failed or succeeded; and (13) failure reason—brief description of reason quotation failed (e.g., insufficient supply availability, business constraints could not be met), which LFM 22 evaluates, updates, and sends to fulfillment server 16.

Process Component Quotations [Fulfillment Server]

Once fulfillment server 16 has processed and sent component ATP requests 32 to LFMs 22, fulfillment server 16 monitors the completion of the resulting component quotations 34. In one embodiment, quotation 36 may be deemed complete when each component ATP request 32 has received at least one component quotation 34 or failure notification. Suppliers may respond to the component ATP requests 32 with multiple acceptable ATP options. Fulfillment server 16 uses these component quotations 34 to generate and send to client 12 a multi-dimensional (variable on product options, lead time, and price, for example) quotation 36. When all the component quotations 34 have been received and quotation 36 is complete, fulfillment service 16 evaluates the overall quotation 36 according to the business constraints specified in the originating ATP request 30. As a result, fulfillment server 16 determines whether the requirements for ATP request 30 have been met and filters any non-conforming supplier responses from the unified quotation 36 to be presented to client 12. In one embodiment, fulfillment server 16 mutates component quotations 34, according to the information and rules they provide, such that together component quotations 34 satisfy the business constraints applied at fulfillment server 16 or asserted along with ATP request 30. Because some clients 12 may not be capable of handling a multi-dimensional quotation 36, the client interface of fulfillment server 16 may also provide for more restrictive use of quotation information according to particular needs.

In general, fulfillment server 16 attempts to provide a "best fit" response to client 12, according to its assessment of quotation 36 against customer and supplier business constraints. If, for example, the ship on-time attribute for ATP request 30 specifies that shipment must be received on time, and one or more component quotations 34 are in some way insufficient, fulfillment server 16 may assign a failure status to ATP request 30 in its entirety. Fulfillment server 16 may simply pass along to client 12 failure status annotations received from LFMs 22. Instead or in addition, fulfillment server 16 may assign failure evaluation annotations of its own. For example, while LFMs 22 may have generated valid component quotations 34, fulfillment server 16 may determine a failure of the overall quotation 36 based on quotation pricing not meeting business constraints for the customer. If a particular request line-item yields multiple component quotations 34, each component quotation 34 must be evaluated relative to the specified constraints. All valid component quotations 34 for the request line-item are transmitted to client 12 in the form of quotation 36 using network 18.

If the ATP server response is satisfactory in one or more ways (based on the products, lead times, or prices, singly or in any combination) then fulfillment server 16 may perform additional functions before generating quotation 36 for communication to client 12. For example, client 12 may require calculation of pricing, taxes, freight, or delivery schedule. Depending on the implementation, this may be accomplished using specialized routines or may involve incorporation of one or more background planning processes that rely on, for example, transportation and logistics planning packages. The use of such "auxiliary" processes may be optionally delayed until client 12 confirms all or a part of quotation 36.

In one embodiment, fulfillment server 16 provides a pricing engine component that operates according to the needs of the customer. For example, when fulfillment server 16 is implemented in conjunction with a packaged ERP system, the customer may prefer that pricing be managed within the ERP system boundaries. In one embodiment, if fulfillment server 16 manages pricing, each component quotation 34 is first priced out at list and then prevailing discounts are applied based upon pre-specified line, request, or volume-level programs. Multiple discounts may be applicable to a given ATP request 30. Pricing and discount programs may be specified according to the customer, customer location, supplier, agreement, product group, product, or any other suitable parameter or set of parameters.

The multi-dimensional response capability of fulfillment server 16 may present a special problem relative to pricing functionality. That is, if more than one option is presented to the user for a particular request line-item, it may be difficult for fulfillment server 16 to evaluate the order as a whole for discounting purposes. Where multiple component quotations 34 exist for a particular component ATP request 32, pricing for ATP request 30 cannot generally be represented as a simple sum total with discount. Instead, the ATP request price becomes a range with minimum and maximum bounds and is not finalized until the ATP request options are confirmed. At that point, pricing is re-calculated and presented to the user upon promise confirmation.

When fulfillment server 16 has completed evaluating quotation 36 relative to the specified constraints of ATP request 30, and quotation 36 has been determined to meet these requirements, fulfillment server 16 sends quotation 36 to client 12 for review and quotation confirmation. If the requesting client 12 is no longer active, quotation 36 may be stored until it can be queried at a later time. The structure of quotation 36 models that of the originating ATP request 30. Quotation 36, however, may be potentially more complex than ATP request 30 since it may contain multiple responses for each request line-item and request line-item delivery.

Quotation Attributes

In one embodiment, the quotation is an object having the following attributes or otherwise supporting the following information, in any appropriate combination and without limitation: (1) quotation ID—assigned at fulfillment server 16 and may be same as request ID; (2) request ID; (3) maximum total price (base currency) maximum total price of quotation calculated at fulfillment server 16 in the base currency, representing upper bound of price quotation; (4) minimum total price (base currency)—minimum total price of quotation calculated at fulfillment server 16 in the base currency, representing lower bound of price quotation; (5)

maximum total price (customer currency)—maximum total price of quotation calculated at fulfillment server 16 in customer-preferred currency; (6) minimum total price (customer currency)—minimum total price of the quotation calculated at fulfillment server 16 in customer-preferred currency; (7) quotation status—fulfillment server 16 updates during life of quotation (e.g., "failed quotation," "pending acceptance," "accepted," "rejected," "acceptance not received"); (8) date accepted—date and time quotation confirmation was processed, if any; and (9) date rejected—date and time quotation was rejected, if any.

Quotation Line-Item Attributes

In one embodiment, the quotation line-item is an object having the following attributes or otherwise supporting the following information, in any combination and without limitation: (1) line-item ID—assigned at fulfillment server 16, accommodating multiple quotation responses per request line-item; (2) quotation ID—links quotation to quotation line-item; (3) product ID—may not directly correspond to product specified in originating request line-item since an alternate or substitute may be quoted instead; (4) product UOM—may not correspond to UOM specified in originating request line-item since ATP server 14 may have responded in different UOM than requested; (5) offered quantity—quantity associated with quotation line-item; (6) offered date—date quantity will be available, which may represent the shipment date given by ATP server 14 or a coordinated customer delivery date, depending on the implementation; (7) offered lot—lot identifier for quotation line-item; (8) offered attributes—list of the category/attribute combinations for quotation line-item; (9) quotation type—type of response (e.g., "as requested," "alternate/substitute," "option"); (10) offered unit price (base currency)—unit price associated with quotation line-item expressed in the base currency of fulfillment server 16; (11) offered total price (base currency)—computed total price associated for quotation line-item expressed in base currency of fulfillment server 16; (12) offered unit price (customer currency)—unit price for quotation line-item expressed in customer-preferred currency; (13) offered total price (customer currency)—computed total price for the quotation line-item expressed in the customer-preferred currency; (14) quotation line-item status—logical parameter fulfillment server 16 updates based on corresponding component quotation status and which indicates whether request line-item succeeded or failed in getting acceptable quotation; (15) failure reason brief description of reason for quotation failing; and (16) quotation line-item acceptance status—indicates whether quotation line-item was accepted or rejected and which fulfillment server 16 uses in generating component quotation confirmation transactions to LFMs 22.

In one embodiment, the quotation line-item delivery is an object having the following attributes or otherwise supporting the following information, in any suitable combination and without limitation: (1) quotation line-item delivery ID—assigned at fulfillment server 16 and accommodates multiple quotation responses per request line-item delivery; (2) quotation line-item ID; (3) offered quanfity; (4) offered date; (5) offered lot; and (6) offered attributes.

Quotation Confirmation Workflow

Figure 3:
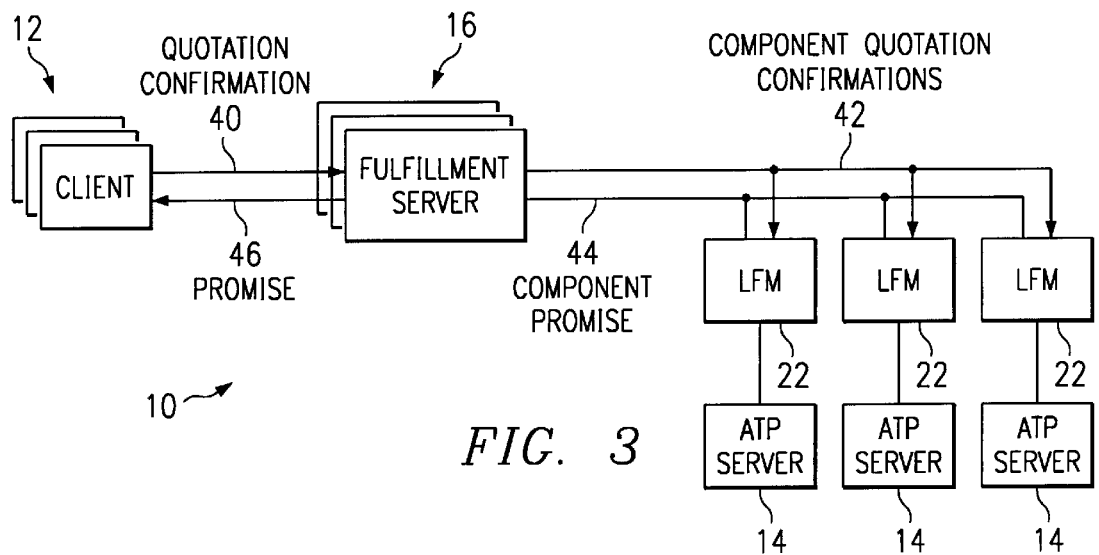
FIG. 3 illustrates an exemplary quotation confirmation workflow according to the present invention.

FIG. 3 illustrates an exemplary quotation confirmation workflow in which client 12 generates a quotation confirmation 40 based on the quotation 36 and, possibly, input from an associated user. Client 12 sends quotation confirmation 40 to fulfillment server 16, where it is decomposed and evaluated. Fulfillment server 16 sends resulting component quotation confirmations 42 to LFMs 22 using network 20, LFMs 22 process component quotation confirmations 42 in cooperation with their associated ATP servers 14, and LFMs 22 generate component promises 44 accordingly. LFMs 22 then send component promises 44 back to fulfillment server 16. Fulfillment server 16 processes component promises 44, generates a single unified promise 46, and sends promise 46 to client 12 for review and confirmation.

Generate Quotation Confirmation [Client]

When quotation 36 is received, client 12 or an associated user reviews and may selectively accept or reject one or more individual quotation line-items or quotation 36 as a whole. Depending on the capabilities of ATP servers 14 and the business constraints relative to ATP request 30, one or more valid options may be made available for any given request line-item. Client 12 or an associated user may then select from multiple options before accepting quotation 36 in whole or in part. Once this process has been completed, client 12 sends quotation confirmation 40, including all the acceptances and rejections, to fulfillment server 16 for processing. Because quotation confirmation 40 may accept only a subset of quotation 36, it is quotation confirmation 40 rather than quotation 36 that will form the basis of the resulting promise 46. If client 12 considers quotation 36 unacceptable, client 12 may queue ATP request 30 for later re-submission. Default constraints specify the period and frequency of request re-submission (re-quote), according to particular needs.

In one embodiment, quotation confirmation 40 is an object having the following attributes or otherwise supporting the following information, in any combination and without limitation: (1) quotation ID; (2) quotation line-item ID; and (3) quotation line-item status—indicates whether quotation line-item was accepted, rejected, canceled, or queued, used at fulfillment server 16 to generate component quotation confirmations 42 for submission to LFMs 22.

Process Quotation Confirmation [Fulfillment Server]

Quotation 36 is a non-binding statement of product availability. Once client 12 accepts quotation 36 in whole or in part, fulfillment server 16 commits the resulting quotation confirmation 40 across the distributed network of LFMs 22 in the form of component quotation confirmations 42, consuming allocated supply at each appropriate ATP server location. In one embodiment, ATP request 30 is a distributed and persistent object that is monitored and maintained at each of the respective commitment locations (LFMs 22). Accordingly, until ATP request 30 is either fulfilled or canceled, component ATP requests 32 remain a part of a distributed order backlog that fulfillment server 16 intelligently manages.

In one embodiment, fulfillment server 16 is capable of processing a variety of responses from client 12 or an associated user, including full or partial acceptance, rejection, re-quotation, changes, cancellations, inquiries, and any other appropriate user responses. If a quotation line-item is accepted, it must be confirmed at LFMs 22 since LFMs 22 will in general not have made supply reservations based on the corresponding component quotation 34. As a result of the lack of reserved supply, however, the line-item may fail such that fulfillment server 16 needs to notify LFMs 22 so that they may take some action if appropriate. In one embodiment, fulfillment server 16 may request LFMs 22 to provide component promises 44 along with component quotations 34, but with a relatively short accept_by date. Fulfillment server 16 may then accept component promises 44 when it receives quotation confirmation 40 from client 12. Fulfillment server 16 is tasked with properly combining accept by dates from LFMs 22 associated with a particular ATP request 30. The resulting accept_by date should generally allow fulfillment server 16 time to compute the quotation 36 (or promise 46) and, preferably, may include some padding. Since most of the responses from LFMs 22 may not reflect the dates products will actually be delivered to the customer, but may instead be statements of supplier shipment schedules, fulfillment server 16 may provide the ability to derive customer delivery dates for the multi-item order, possibly as an optional post-processing step to the promise action.

As discussed above, quotation confirmation 40 may be an object specifying the status of each quotation line-item as accepted, rejected, canceled, or queued. Fulfillment server 16 indicates the status on the corresponding component quotations 34, filters the acceptances from rejections on a line-item basis, and generates component quotation confirmations 42 for submission to LFMs 22. Fulfillment server 16 updates the status of the originating component ATP request 32 to "pending promise." In one embodiment, component quotation confirmation 42 is an object that has the following attributes or otherwise supports the following information, in any suitable combination and without limitation: (1) component quotation ID; (2) LFM ID; and (3) component quotation status—indicates whether component quotation accepted, rejected, or canceled.

Process Component Quotation Confirmations [LFM]

LFM 22 receives component quotation confirmation 42 and generates a promise request to ATP server 14 using command syntax appropriate to the associated planning engine. This transaction is similar to the original component request transaction, except that it seeks a firm commitment from ATP server 14 of product allocation or available materials or capacity. The confirmation transaction must also confirm the commitment corresponding to the desired component quotation 34, such that if the original component ATP request 32 received multiple component quotations 34, LFM 22 must confirm the specific quotation response the user specified at client 12. At this point, ATP server 14 responds with a firm promise, consuming appropriate allocated products or available materials or capacity. In some cases, it may also be appropriate to create the acceptance at this point. LFM 22 may eliminate rejected component quotations 34 based on the rejection commands or any other information received from client 12.

LFM 22 computes a component promise 44 that includes information and rules on how fulfillment server 16 may mutate component promise 44. When the promise response is received from ATP server 14, LFM 22 evaluates the response to ensure that it is consistent with component quotation confirmation 42, since it is possible that the promise response is different from the original component quotation 34. This may occur, for example, where a planning change has in some way altered product availability or when another component quotation confirmation 42 has resulted in the product allocation being consumed in the interim. When this occurs, LFM 22 notes this condition and evaluates whether the promise response still satisfies the business constraints specified in component ATP request 32. If so, LFM 22 generates a component promise 44 according to the promise response from ATP server 14. If multiple promise responses are deemed valid according to the constraints, LFM 22 generates and sends multiple component promises 44 back to fulfillment server 16. If component promise 44 differs in any way from the original component quotation 34, this may be noted in component promise 44. If component promise 44 no longer conforms to the business constraints specified in component ATP request 32, LFM 22 may generate an annotated or other appropriate failure notification for communication to fulfillment server 16. Exemplary annotations may include "insufficient product quantities" or "unable to meet shipment delivery or lot sizing requirements."

In one embodiment, component promise 44 is an object having the following attributes or otherwise supporting the following information, in any suitable combination and without limitation: (1) component promise ID—assigned when LFM 22 creates the component promise and may be identical to the component quotation ID; (2)fulfillment server ID; (3) accept-by—may indicate an expiration date for component promise by which an acceptance must be received or corresponding promise reservations may be released; (4) component promise status—indicates whether the component promise has succeeded or failed; and (5)failure reason—brief description of reason for the promise having failed, if any.

Process Component Promises [Fulfillment Server]

Once fulfillment server 16 has processed component quotation confirmations 42 and sent them to LFMs 22, it monitors completion of the resulting component promises 44. In one embodiment, promise 46 is considered complete when each of the originating component quotation confirmations 42 has received one or more component promises 44 or failure notifications. Fulfillment server 16 may also monitor the promise by attribute specifying the length of time fulfillment server 16 should wait for component promises 44 from LFMs 22. When this constraint is reached before all the component promises 44 have been received, such that the quotation confirmation 40 has essentially expired, fulfillment server 16 may generate an appropriate failure notification and send it to client 12. In formulating promise 46, fulfillment server 16 may take into account any accept-by attributes for component promises 44 and specify an accept-by attribute for promise 46 accordingly.

In one embodiment, once a component promise 44 expires, fulfillment server 16 and appropriate LFMs 22 release reservations of supply. Where fulfillment server 16 provided a stricter accept_by date than LFMs 22, fulfillment server 16 may need to send an indication of the release back to LFMs 22. Similarly, if promise 46 fails or gets rejected, fulfillment server 16 notifies LFMs 22 so that LFMs 22 can release suitable supply reservations.

When fulfillment server 16 receives component promises 44 from LFMs 22 and promise 44 is complete, fulfillment server 16 evaluates the overall promise 44 according to the business constraints specified in the original ATP request 30 to again evaluate the success of the overall response. This is done again during the promise generation phase because it is possible that one or more component promises 44 may be different from the original component quotations 34. Pricing may also need to be calculated again during the promise generation phase if any component promises 44 are different than original component quotations 34. In addition, if there were multiple component quotations 34 for a particular component ATP request 32, it may be necessary to calculate a final confirmed price. In one embodiment, all of the component promises 44 must be valid to achieve a successful promise 46.

In one embodiment, fulfillment server 16 may mutate or otherwise manipulate component promises 44, according to the information and rules they provide, such that together component promises 44 satisfy the business constraints applied at fulfillment server 16 or asserted along with ATP request 30. In addition to sending promise 44 to client 12, fulfillment server 16 may send the mutated component promises 44 back to originating LFMs 22, such that the LFMs 22 may adjust their reservations of supply appropriately.

If the overall response no longer meets requirements of ATP request 30, due to changes in product availability in the interval between quotation 36 and promise 46 or for any other reason, fulfillment server 16 may assign a failure status to promise 46 and annotate it with descriptive information before sending the promise 46 to client 12. Fulfillment server 16 may simply pass along failure status annotations received from LFMs 22. Instead or in addition, fulfillment server 16 may assign an annotation of its own. For example, although LFM 22 may have generated an acceptable component promise 44, fulfillment server 16 may determine that promise 46 fails overall based on promise pricing not meeting specified business constraints for the customer.

Fulfillment server 16 may include a delivery coordination engine component, depending on requirements of the customer. Without this capability, fulfillment server 16 would return the optimal shipment dates from the respective manufacturing and distribution locations rather than returning the delivery date to the customer. Delivery coordination may be accomplished using a relatively simple table-driven technique that links products, locations, and standard lead times. More sophisticated implementations may involve the use of an advanced planning engines for transportation and logistics optimization. In this scenario, it is likely that delivery coordination may be calculated in multiple phases. For example, a table-based standard lead time approach may be used in the initial promise generation phase to derive a preliminary delivery date. Because transportation planning optimization is generally most effective when the requirements of multiple deliveries are considered, a second phase of batch-oriented processing may be desirable to evaluate the entire request backlog. As a result of such second-phase processing, the delivery dates corresponding to the individual ATP requests 30 may be adjusted to reflect an optimized overall delivery plan.

When fulfillment server 16 has completed evaluating promise 46, has calculated pricing and delivery as appropriate, and the overall response is still deemed satisfactory, then fulfillment server 16 sends promise 46 (including all valid component promises 44) to client 12 for confirmation. The structure of promise 46 models that of the originating quotation 36, but is potentially simpler than its quotation counterpart since quotation 36 may have been multi-dimensional whereas the promise 46 is discrete. If the requesting client 12 is no longer active, promise 46 can be queried at a later point.

Promise Attributes

In one embodiment, promise 44 is an object having the following attributes or supporting the following information, in any suitable combination and without limitation: (1) promise ID—assigned at fulfillment server 16 and may be identical to quotation ID; (2) total price (base currency)— total price of promise calculated at fulfillment server 16 in base currency; (3) total price (customer currency)—total price of promise calculated at fulfillment server 16 in customer-preferred currency; (4) total tax (base currency)— total tax associated with request calculated at fulfillment server 16 in base currency; (5) total tax (customer currency)—total tax associated with request calculated at fulfillment server 16 in customer-preferred currency; (6) date confirmed—date and time promise processed; (7) accept-by—may indicate an expiration date for promise by which an acceptance must be received or some or all associated promise reservations may be released; (8) date canceled—date and time promise was canceled, if any; and (8) date shipped—date and time promise was fulfilled, if any.

Promise Line-Item Attributes

In one embodiment, the promise line-item is an object having the following attributes or otherwise supporting the following information, in any combination and without limitation: (1) promise line-item ID—assigned at fulfillment server 16 and may be identical to quotation line-item ID; (2) product ID for promised product; (3) product UOM for promised product; (4)promised quantity for promise line-item; (5)promised ship date—date promised quantity will be available to ship and representing shipment date given by ATP server 14; (6) customer delivery date—date promised quantity will arrive at the designated customer ship-to location and which may be calculated and updated using a transportation planning and logistics engine; (7) promised lot; (8) promised attributes; (9) promise type—type of response for promise line-item (e.g., "as requested," "alternate/substitute," "option"); (10) promised unit price (base currency)—unit price in fulfillment server base currency; (11) promised total price (base currency)—computed total price in the fulfillment server base currency; (12) promised unit price (customer currency)—unit price in the customer-preferred currency; (13) promised total price (customer currency) computed total price in the customer-preferred currency; (14) promise line-item status fulfillment server 16 updates according to the corresponding component promise status, indicating whether request line-item succeeded or failed in getting an acceptable promise response; (15) accept-by—may indicate an expiration date for promise line-item by which an acceptance must be received or associated promise reservations may be released; (16)failure reason; (17) date—time shipped; and (17) date canceled.

In one embodiment, the promise line-item delivery is an object having the following attributes or otherwise supporting the following information, in any suitable combination and without limitation: (1) promise line-item delivery ID—assigned at fulfillment server 16 and possibly identical to the quotation line-item delivery ID; (2) promised quantity; (3) promised ship date; (4) customer delivery date; (5) promised lot; and (6) promised attributes.

Promise Acceptance Workflow

Figure 4:
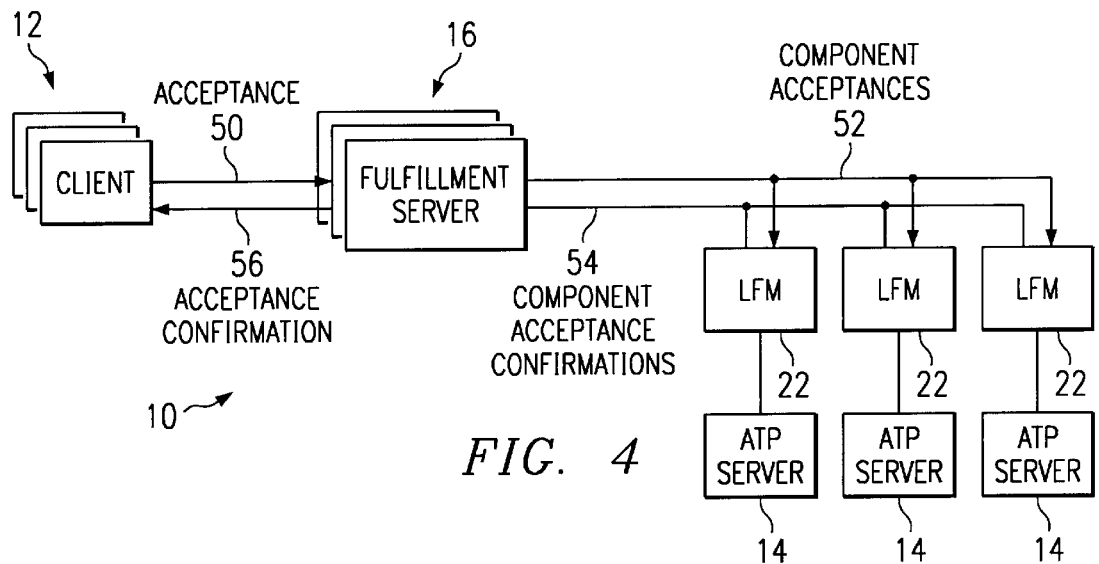
FIG. 4 illustrates an exemplary promise acceptance workflow according to the present invention.

FIG. 4 illustrates an exemplary promise acceptance workflow in which the client 12 generates an acceptance 50 based on promise 46 and, possibly, input from an associated user. Client 12 sends the acceptance 50 to fulfillment server 16, where it is decomposed and evaluated. Fulfillment server 16 then sends the resulting component acceptances 52 to LFMs 22 using network 20, LFMs 22 process component acceptances 52 in cooperation with associated ATP servers 14, and LFMs 22 generate component acceptance confirmations 54 as appropriate. LFMs 22 send the component acceptance confirmations 54 back to fulfillment server 16, where they are processed such that a final acceptance confirmation 56 can be sent to client 12 using network 18, completing the cycle.

While this workflow describes an interactive promise acceptance scenario, the present invention contemplates non-interactive acceptance processing such as typically associated with EDI-based workflows. In some cases, it may be appropriate to perform concurrent quotation confirmation and promise acceptance processing. Separating the interactive quotation confirmation and promise acceptance processing is appropriate, however, if there is a likelihood that product availability may change in the interval between quotation confirmation 40 and acceptance 50. In this case, the user may want the ability to optionally reject promise 46 if it no longer reflects quotation 36. This type of scenario may be specific to SCP-based. ATP server environments. Those skilled in the art will appreciate that system 10 accommodates EDI-based and any other suitable workflows and that the present invention encompasses all such workflows.

Generate Acceptance [Client]

Once client 12 or an associated user has evaluated promise 46 received from fulfillment server 16, client 12 or the user may accept promise 46 in whole or in part. Client 12 generates a formal acceptance 50 corresponding to the originating ATP request 30 and sends it to fulfillment server 16 for processing.

Acceptance Attributes

In one embodiment, acceptance 50 is an object having the following attributes or otherwise supporting the following information, in any appropriate combination and without limitation: (1) acceptance ID—assigned at fulfillment server 16 and may be identical to quotation ID and promise ID; (2) total price (base currency); (3) total price (customer currency); (4) total tax (base currency); (5) total tax (customer currency); (6) date accepted—date and time acceptance was processed; (7) date canceled—date and time acceptance was canceled, if any; and (8) date shipped—date and time acceptance was fulfilled.

In one embodiment, the acceptance line-item is an object having the following attributes or otherwise supporting the following information, in any combination and without limitation: (1) acceptance line-item ID—assigned at fulfillment server 16 and which may be identical to quotation line-item ID and promise line-item ID; (2) product ID; (3) product UOM; (4) promised quantity for the acceptance line-item; (5) promised ship date; (6) customer delivery date; (7) accepted lot—lot identifiers associated with acceptance line-item; (8) accepted attributes—list of category/attribute combinations associated with acceptance line-item; (9) accept type type of response for acceptance line-item (e.g., "as requested," "alternate/substitute," "option"); (10) accepted unit price (base currency)—unit price for acceptance line-item expressed in the fulfillment server base currency, likely to have been computed in the promising phase; (11) accepted total price (base currency)—computed total price for acceptance line-item expressed in the fulfillment server base currency, likely to have been computed in the promising phase; (12) accepted unit price (customer currency)—unit price for the acceptance line-item expressed in customer-preferred currency, likely to have been computed in promising phase; (13) accepted total price (customer currency)—computed total price for the acceptance line-item expressed in the customer-preferred currency, likely to have been computed in promising phase; (14) acceptance line-item status—logical parameter that fulfillment server 16 updates based on the corresponding component promise status and which indicates whether request line-item succeeded or failed in getting an appropriate acceptance; (15)failure reason—brief description of reason for the failed acceptance, if any; (16) date shipped date and time acceptance line-item was shipped, if any; and (18) date canceled—date and time acceptance line-item was canceled, if any.

In one embodiment, the acceptance line-item delivery is an object having the following attributes or otherwise supporting the following information, in any suitable combination and without limitation: (1) acceptance line-item delivery ID—assigned at fulfillment server 16 and may be identical to the quotation delivery line-item ID; (2) acceptance quantity for the acceptance line-item delivery; (3) promised ship date; (4) customer delivery date; (5) promised lot—lot identifiers associated with acceptance line-item delivery; and (6) promised attributes—list of category/attribute combinations for acceptance line-item delivery.

Process Acceptance [Fulfillment Server]

In one embodiment, acceptance 50 is an object specifying the status of each of the promise line-items as accepted, rejected, canceled, or queued. Fulfillment server 16 indicates the status on the corresponding component promises 44, filters acceptances from rejections on a line-item basis, and then generates component acceptances 52 for submission to LFMs 22. Fulfillment server 16 may also update the status of component ATP requests 32 as appropriate.

Process Component Acceptances [LFM]

When LFM 22 receives component acceptances from fulfillment server 16, it generates and executes an acceptance transaction in the syntax appropriate to the ATP server 14 and associated planning engine. This transaction is similar to the originating component quotation confirmation 42 except that it creates a formal acceptance to the existing promise 46. LFM 22 records the confirmation responses from ATP server 14 and sends corresponding component acceptance confirmations 54 back to fulfillment server 16 using network 18.

Process Component Acceptance Confirmations [Fulfillment Server]

Once fulfillment server 16 has processed and sent component acceptances 52 to LFMs 22, it monitors the completion of resulting component acceptance confirmations 54. In one embodiment, acceptance confirmation 56 is considered complete when each of the component acceptances 52 has received one or more component acceptance confirmations 54. When fulfillment server 16 has received all component acceptance confirmations 54 and the acceptance confirmation 56 is complete, fulfillment server 16 sends the final acceptance confirmation 56, including all valid component acceptance confirmations 54, to client 12 using network 18.

ATP Request Changes Workflow

In this workflow, client 12 queries an active ATP request 30, changes some or all portions of ATP request 30, and re-submits ATP request 30 to fulfillment server 16. Fulfillment server 16 then brokers the changed ATP request 30 across the distributed network of LFMs 22 and manages any non-conforming responses. For example, client 12 may re-quote the order in whole or in part with the intention of improving the promised quantities or the delivery dates associated with ATP request 30. Client 12 may also query an active ATP request and then cancel the ATP request 30, in which case fulfillment server 16 must propagate this cancellation to each of the LFMs 22 handling a portion of ATP request 30. In one embodiment, the cancellation effectively deletes ATP request 30 at each location of data persistence, including appropriate LFMs 22 and fulfillment server 16.

Initiate ATP Request Changes [Client]

Once ATP request 30 has been displayed at client 12 through inquiry, the user may be able to enter an "edit request" mode. In this mode, the user is able to change the request in any appropriate manner, for example, adding or deleting request line-items, changing required quantities and dates, or adjusting the associated business constraints. Client 12 or the user then re-submits the changed ATP request 30 or queues the changed ATP request 30 for future re-submission (re-quote). In one embodiment, if ATP request 30 has been completely fulfilled, changes may not be made. If ATP request 30 has been partially fulfilled, only request line-items that are still pending may be changed.

Process ATP Request Changes [Fulfillment Server]

Fulfillment server 16 evaluates the re-submitted ATP request 30 and determines the changes that have been made to any portion of the request structure (i.e. request, request line-item, or request line-item delivery). For changed portions of ATP request 30, fulfillment server 16 revises existing component ATP requests 32 accordingly. This may involve re-evaluating any sourcing, alternate or substitution, or other preferences as well as the specified business constraints. The changes may also include adding or individual request line-items. Once fulfillment server 16 has completed these revisions, resulting component ATP requests 32 are again sent out onto network 20 for servicing at LFMs 22. The status of each component ATP request 32 may be set to "pending quotation" or "pending cancellation," as appropriate.

Process Component ATP Requests [LFM]

When LFM 22 receives changed component ATP request 32 from fulfillment server 16, LFM 22 generates and executes a request transaction in a syntax appropriate to ATP server 14 and the associated planning engine. At this point, changed component ATP request 32 is processed to ATP server 14 as though it was a new component ATP request 32. Any component ATP request cancellation may be processed to ATP server 14 as a deletion.

LFM 22 evaluates the response from ATP server 14 according to the business constraints that are specified in the changed component ATP request 32. Processing requirements for LFM 22 at this stage may be identical to those with respect to a new component ATP request 32. For cancellations, LFM 22 may update the status of any locally maintained component ATP request 32 or component quotation 34 as "canceled." LFM 22 receives the component quotation response from ATP server 14 and sends the constraint-compliant responses to fulfillment server 16 in the form of a new component quotation 34. Descriptive or other failure notifications may be created in the manner described above. If necessary, cancellation confirmations are also created and sent to fulfillment server 16.

Process Component Quotations [Fulfillment Server]

When fulfillment server 16 has processed and sent the changed component ATP requests 32 to LFMs, it monitors completion of the resulting component quotations 34. In one embodiment, quotation 36 is deemed complete when each originating changed component ATP request 30 has received one or more component quotations 34, failure notifications, or cancellation confirmations, as the case may be. Fulfillment server 16 may update the status of any ATP request 30 and quotation 36 maintained at fulfillment server 16 based on any cancellation confirmations received from LFMs 22.

Once component quotation 34 have been received and quotation 36 is deemed complete, fulfillment server 16 re-evaluates the overall quotation 36 according to the business constraints specified in the originating changed ATP request 30. Processing is identical to that of a quotation 36 for a new ATP request 30. Quotation pricing may be re-calculated from scratch or otherwise in light of the existing confirmed prices with the newly quoted items. When fulfillment server 16 has evaluated quotation 36 relative to the specified ATP request constraints, a unified quotation 36 is presented to client 12. This process is similar to that of a new quotation 36, except that the original quotation 36 already exists and thus fulfillment server 16 only updates portions of quotation 36 associated with the changed ATP request 30. Failure notifications and cancellation confirmations may be generated and sent to client 12 as appropriate. Subsequent user confirmation processing may be accomplished on a net change basis and may reflect processing described above with respect to the quotation confirmation and promise acceptance workflows.

Re-Quote Workflow

In one embodiment, client 12 or an associated user is able to re-quote an existing ATP request 30 at any point before total or partial order cancellation or fulfillment. This capability does not affect any existing promise 46, but simply results in a new quotation 36. Client 12 or an associated user must accept new quotation 36 to obviate existing promise 46. Thus, all processing is substantially the same as for the initial ATP request 30, except for the treatment of the data objects. Client 12 or an associated user queries the original ATP request 30 to initiate this processing. Once ATP request 30 has been displayed through inquiry, the user may then select an appropriate re-quote function and client 12 executes the re-quote command.

Queue ATP Request Workflow

Fulfillment server 16 may support intelligent queuing of requests, which may be configurable according to a user, customer, or other profile, information received from client 12 or an associated user, or information received from a system administrator or function. Request queue parameters may specify the conditions under which queuing is to occur, the duration of the queuing, and the frequency with which requests are re-submitted. Since any change throughout the distributed LFMs 22 and ATP servers 14 may allow a queued request to get a satisfactory promise, such changes should be sent to one or more fulfillment server servers 16. Each fulfillment server 16 can reconsider its queued requests in view of the changes, possibly initiating an appropriate quotation or promising workflow. Queueing of ATP requests 30 is described more fully in U.S. application Ser. Nos. 08/491,167 and 08/802,434.

Initiate ATP Request Queue [Client]

In one embodiment, client 12 or an associated user may queue an existing ATP request 30 at any point before total or partial order cancellation or fulfillment. Queued ATP requests 30 are periodically submitted for re-quoting with the intent of improving the quotation result. Similar to the re-quote transaction described above, the queuing process does not effect any existing promise 46, but simply results in a new quotation 36. Client 12 or an associated user may execute a queue function to initiate queue processing after the unsatisfactory result of an initial ATP request 30 or after querying an existing ATP request 30. Queuing behavior may be limited according to specified parameters concerning re-try intervals, maximum number of tries, and the like.

Process ATP Request Queue [Fulfillment Server]

Fulfillment server 16 receives the request queue instruction as a confirmation indicating that all request line-items have been queued. Based on this confirmation, fulfillment server 16 updates the status of each request line-item to "queued." Further processing of ATP request 30 suspends until queuing parameters for such processing have been met. Based on a specified re-try interval or otherwise, fulfillment server 16 may periodically re-submit the queued component ATP requests 32 to LFMs 22 for quotation. At this point, the processing is identical to that of the Process Re-Quote workflow discussed above.

Component Promise Changes Workflow

Figure 5:
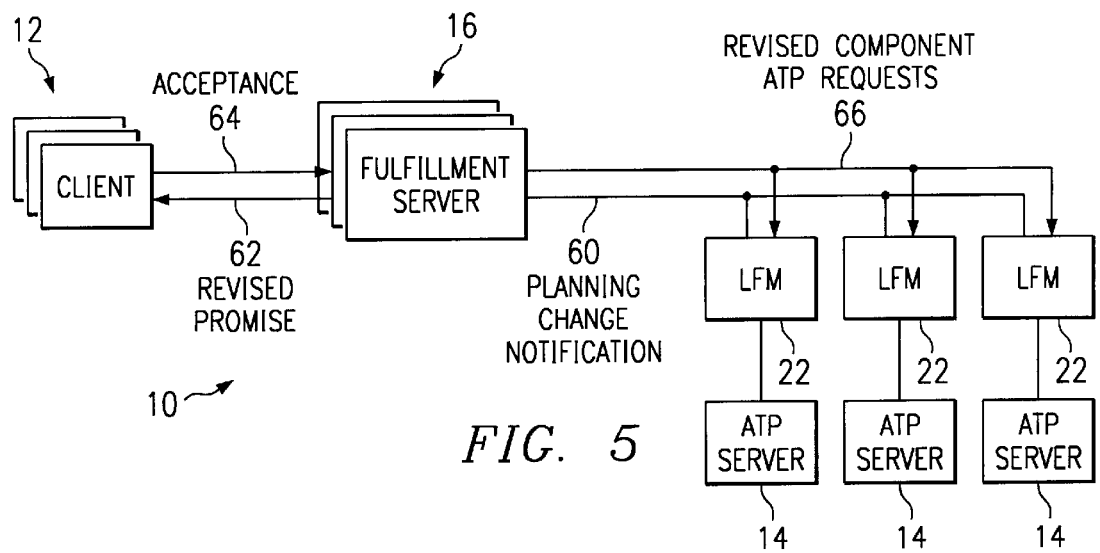
FIG. 5 illustrates an exemplary component promise changes workflow according to the present invention.

FIG. 5 illustrates a component promise changes workflow according to the present invention. This or a similar workflow may be used to handle modification of any appropriate existing quantity, acceptance, promise, quotation, request, or supply. It is common for the supply supporting backlogged component ATP requests 32 to fluctuate over time. Some types of changes are infrequent, but others are common and must be handled efficiently. As an example, planned supply often changes on a regular basis, usually at least weekly, often daily, sometimes more frequently. Furthermore, supply allocations to various products or sellers, as described in copending U.S. application Ser. Nos. 08/491,167 and 08/802,434, typically change at least as frequently. In both cases, all affected elements within distributed system 10 should be notified and any pending quotations 36 or promises 46 may need to be adjusted or marked stale.

The impact of changes in production plans and schedules is likely to propagate downstream to component ATP requests 32 at LFMs 22, causing one or more existing commitments to be invalidated. The end result might be that one or more component ATP requests 32 is rescheduled for later in the planning horizon or simply shorted. In one embodiment, LFM 22 monitors the status of component ATP requests 32 to identify such events and communicates accordingly with fulfillment server 16. As an example, ATP server 14 might "publish" to LFM 22 the supply changes effecting the backlogged component ATP requests 32, LFM 22 might then notify fulfillment server 16, and the fulfillment server 16 might evaluate the revised component request status and act, for example, by notifying client 12 of the situation and providing one or more options to client 12. Similarly, changes made at fulfillment 16 server may need to be sent to the affected LFMs 22 so that they may adjust reservations of supply accordingly. Further, each of the workflows described above may support one or more alternative workflows to handle cases in which the ATP data components of system 10 have been working with becomes invalid due to such changes.

Process ATP Server Changes [LFM]

In one embodiment, system 10 provides an interface protocol between LFMs 22 and ATP servers 14 such that planning changes affecting the promise characteristics of component ATP requests 32 in associated planning engines are proactively identified within ATP servers 14 and sent to LFMs 22 for evaluation. This evaluation processing is identical to that of the initial component promise response; that is, LFM 22 evaluates the changed component promise response according to the constraints specified in the originating ATP request 30. The revised promise from ATP server 14 may not change the commitment between the customer and the supplier. Since in one embodiment promise 46 and acceptance 50 are distinct objects, a change to promise 46 does not change acceptance 50, which generally represents the binding business commitment between the customer and supplier. Schedule and other changes may be negotiated and resolved such that the original commitment can be kept. However, the binding business commitment does not change until client 12 or an associated user accepts the revised promise 62 and a new acceptance 64 is created.

Whether or not a planning change has affected the validity of the component promise 44, LFM 22 generates a planning change notification 60 for the change and may also note any failure conditions that exist. Planning change notification 60 is generated in a suitable format and sent to fulfillment server 16 using network 20. Planning change notification 60 may prompt fulfillment server 16 to generate a revised promise 62 and send it to client 12. Instead or in addition, fulfillment server 16 may evaluate planning change notification 60 and generate one or more revised component ATP requests 66, which are sent to and processed at LFMs 22 in essentially the same manner as for the changed component ATP requests 32 described above. Fulfillment server 16 may act on planning change notification 60 in any appropriate manner according to the needs of clients 12 and associated customers and users.

Process LFM Changes [Fulfillment Server]

Fulfillment server 16 monitors and responds to LFM-initiated events such as component promise changes. Component promise changes within the planning engine associated with ATP server 14 may have substantially impacted the integrity of original promise 46. Therefore, in one embodiment, fulfillment server 16 reevaluates promise 46 according to the constraints specified in the original ATP request 30. For example, depending on the value of the short proportional attribute associated with ATP request 30, fulfillment server 16 may adjust the promises of all request line-items proportionally and release the shorted allocations of other request line-items. Failing to do this might leave products tied up for the customer even though the customer would not ultimately accept those products. Fulfillment server 16 may try one or more alternate suppliers before adjusting or failing ATP request 30, or may simply generate a suitable problem notice for client 12 or an associated user to review and resolve.

Fulfillment server 16 may provide the capability to optionally re-price promise 46 in the event of an LFM-initiated change, possibly determining whether any pricing calculations are necessary based on the nature of the change. For example, a change in the shipment date for ATP request 30 may not require re-pricing, while a change in the quantity may cause the promised price to be invalid. Instead or in addition, fulfillment server 16 may provide the ability to re-calculate delivery dates based on LFM-initiated changes, possibly determining whether any delivery calculations are necessary based on the nature of the change. For example, a change in the quantity for ATP request 30 may not require delivery coordination, while a change in a shipment date may result in the promised delivery being invalid.

When fulfillment server 16 has evaluated any changed component promises 44 relative to the constraints specified in ATP request 30, fulfillment server 16 generates a revised promise 62 and sends it to client 12. This processing is identical to promise confirmation processing, except that original promise 46 already exists and fulfillment server 16 may only update the portions of promise 46 associated with the ATP request changes in generating revised promise 62. Failure notifications may be generated as appropriate. At this stage, client 12 or an associated user may wish to simply live with the changes, generating and sending acceptance 64 to fulfillment server 16, or proceed into a re-quote, change, or cancellation workflow.

ATP Request Cancellation Workflow

Initiate ATP Request Cancellation [Client]

In one embodiment, client 12 or an associated user may be able to cancel an ATP request 30 at any point in its life cycle unless the supplier business constraints explicitly preclude it, for example, outside a specified time interval. As a result, ATP request may 30 be canceled during initial generation, during quotation processing, after acceptance, and even after partial fulfillment. The intent of cancellation is to make ATP request 30 permanently inactive. Client 12 or an associated user may query the ATP request 30 to initiate this processing. Once ATP request 30 has been displayed at client 12 through inquiry, the user may select a cancellation function to cause client 12 to execute the cancellation command.

Process ATP Request Cancellation [Fulfillment Server]

Fulfillment server 16 receives the request cancellation from client 12 in a form indicating that all the request line-items have been canceled. Fulfillment server 16 next determines if there exist any product or supplier restrictions on cancellation. If so, a failure notification is immediately generated and sent to client 12 using network 18. After fulfillment server 16 determines the validity of the request cancellation, it updates the status of each request line-item to "canceled." Fulfillment server 16 then sends the resulting component request cancellations out onto network 20 for processing at the appropriate LFMs 22.

Process Component ATP Request Cancellations [LFM]

When LFM 22 receives the component request cancellations from fulfillment server 16, it generates and executes the cancellation transaction in the syntax appropriate to ATP server 14 and the associated planning engine. This transaction is most likely an ATP request deletion. When ATP server 14 responds to LFM 22 with a confirmation of the cancellation, LFM 22 updates the status of any locally maintained component ATP request, component quotation, and component promise. LFM 22 generates a component cancellation confirmation and sends it to fulfillment server 16 using network 20.

Process Component Confirmations [Fulfillment Server]

When fulfillment server 16 has processed and transmitted component request cancellations to LFMs 22, it monitors completion of resulting component cancellation confirmations. In one embodiment, a cancellation confirmation is deemed complete when each component request cancellation has received a component cancellation confirmation. Fulfillment server 16 may note the cancellation in any ATP request 30, quotation 36, and promise 46 maintained at fulfillment server 16. The final cancellation confirmation is generated and sent to client 12 using network 18, terminating the ATP request life cycle.

Fulfillment Confirmations Workflow

Process Component Fulfillment Notifications [LFM]

In one embodiment, system 10 provides an interface protocol between LFMs 22 and ATP servers 14 such that shipment notifications at associated planning engines are proactively identified at ATP servers 14 and sent to LFMs 22. LFM 22 may update the status of locally maintained component ATP request 32 and component promise 44 to reflect the fulfillment before sending a resulting component fulfillment notification to fulfillment server 16 using network 20.

Process Fulfillment Notifications [Fulfillment Server]

Once acceptance 50 has been suitably processed, fulfillment server 16 monitors for component fulfillment notifications from LFMs 22. ATP request 30 is considered fulfilled when each component ATP request 32 has received a component fulfillment notification. A unified fulfillment notification is generated and sent to the requesting client 12 using network 18. When component ATP requests 32 have been fulfilled, fulfillment server 16 may also monitor corresponding shipment confirmations. When ATP request 30 has been fully shipped, its status is updated and fulfillment server 16 notifies the requesting client 12. Fulfillment server 16 may provide archive capabilities for fulfilled ATP requests 30, which may be configurable to allow client 12 to specify archive parameters such as when ATP requests 30 are to be archived and the number of periods of request history to be maintained. Archives may be maintained at fulfillment server 16, at one or more locations associated with LFMs 22, or at any other suitable location internal or external to system 10.

What is claimed is:

1. A system for automatically managing available-to-promise (ATP) data, comprising:
   a client interface operable to facilitate communication between a centralized fulfillment server and a plurality of client systems;
   an ATP server interface operable to facilitate communication between the centralized fulfillment server and a plurality of ATP servers; and
   the centralized fulfillment server, the centralized fulfillment server allowing the plurality of client systems to submit ATP requests for quotation without first identifying or directly communicating with any of the plurality of ATP servers that are to be used in generating quotations corresponding to the ATP requests, the centralized fulfillment server operable to:
   receive a first ATP request from a first one of the plurality of client systems using the client interface, the first ATP request comprising a plurality of request line-items each corresponding to a desired product;
   automatically select a first plurality of ATP servers from among the plurality of ATP servers according to the request line-items within the first ATP request;
   generate a plurality of component ATP requests based on the request line-items contained in the first ATP request;
   communicate the plurality of component ATP requests to the selected first plurality of the ATP servers using the ATP server interface, one or more component ATP requests being communicated to each ATP server in the selected first plurality of ATP servers;
   receive a plurality of component quotations from the selected first plurality of ATP servers using the ATP server interface, each component quotation corresponding to a component ATP request and comprising product availability information for one or more desired products corresponding to the component ATP request;
   generate a quotation determined according to the product availability information provided by the plurality of component quotations received from the selected first plurality of ATP servers; and
   communicate the quotation to the first one of the plurality of client systems using the client interface.

2. The system of claim 1, wherein the first ATP request specifies one or more business constraints and the centralized fulfillment server is further operable to evaluate the component quotations according to the business constraints in generating the quotation.

3. The system of claim 2, wherein at least some of the business constraints are based on a customer profile.

4. The system of claim 1, wherein the centralized fulfillment server is further operable to evaluate the component quotations according to supplier-specified business constraints in generating the quotation.

5. The system of claim 1, wherein each of the plurality of ATP servers is associated with a local fulfillment manager (LFM) that manages processing of component ATP requests at a planning engine associated with the ATP server.

6. The system of claim 1, wherein the centralized fulfillment server receives the first ATP request from the first one of the plurality of client systems and, concurrent with the first ATP request, receives a second ATP request from a second one of the plurality of client systems.

7. The system of claim 1, wherein the centralized fulfillment server is further operable to communicate at least one component ATP request to a target ATP server of the selected first plurality of ATP servers based on one or more business constraints within the first ATP request.

8. The system of claim 1, wherein the centralized fulfillment server allows the plurality of client systems to submit quotation confirmations for promising without directly communicating with any of the plurality of ATP servers that are to be used in generating promises corresponding to the quotation confirmations, the centralized fulfillment server further operable to:

using the client interface, receive a quotation confirmation comprising acceptances of at least some of the quotation line-items within the quotation, each of the quotation line-items corresponding to a particular accepted product;

automatically select one or more second ATP servers from among the selected first plurality of ATP servers according to the acceptances of quotation line-items within the quotation confirmation;

generate a component quotation confirmation for each accepted quotation line-item;

communicate component quotation confirmations to the one or more selected second ATP servers using the ATP server interface;

receive a plurality of component promises from the one or more selected second ATP servers using the ATP server interface, each corresponding to a component quotation confirmation and each representing a commitment of product availability for corresponding accepted products;

generate a promise comprising commitments of product availability for accepted products according to the component promises; and communicate the promise to the first one of the plurality of client systems using the client interface.

9. The system of claim 8, wherein the centralized fulfillment server is further operable to evaluate the component promises according to business constraints profiled for a customer in generating the promise.

10. The system of claim 8, wherein the centralized fulfillment server is further operable to receive a promise acceptance from the first one of the plurality of client systems using the client interface and to communicate the promise acceptance to the one or more selected second ATP servers for fulfillment of the ATP request.

11. A centralized fulfillment server for operation in a distributed supply chain planning environment, operable to:

allow a plurality of client systems to submit available-to-promise (ATP) requests for quotation without first identifying or directly communicating with any of a plurality of local fulfillment managers (LFMs) that are to be used in generating quotations corresponding to the ATP requests;

receive at least one ATP request from a first one of the plurality of client systems, the ATP request comprising a plurality of request line-items each corresponding to a desired product;

automatically select a first plurality of LFMs from among the plurality of LFMs according to the request line-items within the first ATP request;

generate a plurality of component ATP requests based on the request line-items contained in the ATP request, each generated component ATP request corresponding to a request line-item;

communicate the plurality of component ATP requests to the selected first plurality of LFMs for quotation, one or more component ATP requests being communicated to each of the selected first plurality of LFMs, each selected first LFM being associated with a planning engine;

receive a plurality of component quotations from the selected first plurality of LFMs, each component quotation corresponding to a component ATP request and comprising product availability information for one or more desired products corresponding to the component ATP request;

generate a quotation determined according to the product availability information provided by the plurality of component quotations received from the selected first plurality of LFMs; and communicate the quotation to the first one of the plurality of client systems.

12. The centralized fulfillment server of claim 11, wherein each of the plurality of ATP requests specifies one or more business constraints and the centralized fulfillment server is further operable to generate the plurality of component ATP requests according to the business constraints.

13. The centralized fulfillment server of claim 12, wherein at least some of the business constraints are based on a customer profile.

14. The centralized fulfillment server of claim 11, further operable to communicate at least one component ATP request to a target one of the selected first plurality of LFMs based on one or more business constraints within the ATP request.

15. The centralized fulfillment server of claim 11, further operable to:

receive a plurality of component promises from at least one of the selected first plurality of LFMs, each of the component promises corresponding to a component ATP request and representing a commitment of product availability for the corresponding desired product;

generate a promise comprising commitments of product availability for all the desired products according to the component promises; and communicate the promise to the first one of the plurality of client systems.

16. The centralized fulfillment server of claim 15, further operable to evaluate component promises according to business constraints profiled for a customer in generating the promise.

17. A local fulfillment manager (LFM) having an associated available-to-promise (ATP) server and operating in a distributed supply chain planning environment including other LFMs, comprising:

a fulfillment server interface operable to facilitate communication between the LFM and a centralized fulfillment server, the centralized fulfillment server allowing a plurality of client systems to submit ATP requests for quotation without first identifying or directly communicating with any of the LFMs or associated ATP servers that are to be used in generating quotations corresponding to the ATP requests; and an ATP server interface operable to facilitate communication between the LFM and the associated ATP server;

the LFM operable to receive one or more component ATP requests from the centralized fulfillment server, each component ATP request corresponding to a particular ATP request line-item for a desired product within an ATP request submitted by one of the plurality of client systems to the centralized fulfillment server for quotation, the LFM further operable to determine an ATP response for each ATP request line-item using the associated ATP server and generate a component quotation for each ATP request line-item according to the corresponding ATP response, each component quotation comprising product availability information for the desired product associated with the corresponding component ATP request, the LFM further operable to communicate each component quotation to the centralized fulfillment server for consolidation with one or more other component quotations from one or more other LFMs such that a quotation comprising the consolidated component quotations is returned to the one of the plurality of client systems without the one of the plurality of client systems first identifying or directly communicating with any of the LFMs from which the component quotations were communicated.

18. The LFM of claim 17, wherein each component ATP request specifies one or more business constraints and the LFM is further operable to evaluate the ATP response according to the business constraints in generating the component quotations.

19. The LFM of claim 18, wherein at least some of the business constraints are based on a customer profile.

20. The LFM of claim 17, wherein the LFM is further operable to generate the component quotations according to supplier-specified business constraints.

21. The LFM of claim 17, wherein the LFM manages processing of the component ATP requests at an associated planning engine, the LFM being operable to compute a portion of the ATP response according to information obtained from the ATP server, the portion depending on the capabilities of the ATP server and its associated planning engine.

22. The LFM of claim 17, further operable to:
receive from the centralized fulfillment server a component quotation confirmation for each component quotation accepted at the one of the plurality of client systems as a quotation line-item, the centralized fulfillment server allowing the one of the plurality of client systems to submit a quotation confirmation for promising without directly communicating with any of a plurality of LFMs or associated ATP servers that are to be used in generating a promise corresponding to the quotation confirmation;
determine a promise response for each accepted quotation line-item using the associated ATP server;
generate a component promise for each accepted quotation line-item, representing a commitment of product availability for the corresponding accepted product; and
communicate the component promises to the centralized fulfillment server for consolidation with component promises from one or more other LFMs such that a promise comprising the consolidated component promises is returned to the one of the plurality of client systems without the one of the plurality of client systems directly communicating with any of the plurality of LFMs from which the component promises were communicated.

23. The LFM of claim 22, further operable to evaluate the promise responses according to business constraints profiled for a customer in generating the component promise.

24. The LFM of claim 17, wherein the component ATP requests correspond to individual items and the LFMs are operable to compute component quotations that include information and rules regarding how the centralized fulfillment server may mutate those component quotations.

25. The LFM of claim 17, wherein the component ATP requests correspond to individual items and the LFMs are operable to compute component promises that include information and rules regarding how the centralized fulfillment server may mutate those component promises.

26. The LFM of claim 17, wherein the LFM is further operable to:
receive a sequence of component ATP requests from the centralized fulfillment server, one or more first component ATP requests in the sequence targeted to the LFM;
process the first component ATP requests targeted for the LFM to compute one or more resulting component quotations;
pass the resulting component quotations, along with remaining component ATP requests in the sequence, to a second LFM targeted by one or more second component ATP requests in the sequence.

27. The LFM of claim 17, wherein the LFM is operable to:
support a seller hierarchy also supported by the centralized fulfillment server;
support a subset of products supported by the centralized fulfillment server; and
compute component quotations or component promises on a per product basis based upon allocations throughout the seller hierarchy for the subset of products.

28. The LFM of claim 17, wherein the LFM is operable to:
support a subset of products in a hierarchy of related products supported by the centralized fulfillment server; and
compute component quotations or component promises based upon allocations for the subset of products throughout the hierarchy.

29. The LFM of claim 28, wherein the LFM is further operable to compute availability of generics of a product by sending component ATP requests to a second LFM that corresponds to the generic products.

30. The LFM of claim 17, wherein the LFM corresponds to a seller within a seller hierarchy supported by the centralized fulfillment server and is operable to:
hold allocations of supply for the corresponding seller;
compute all component quotations or component promises possible with the allocations it contains; and
send the component quotations or component promises to the centralized fulfillment server for combination, for each product, as if the ATP request had been quoted or promised by a single system having all the allocations.

31. The LFM of claim 30, wherein the LFM is further operable to compute availability of a corresponding parent seller by sending component ATP requests to a second LFM corresponding to the parent seller.

32. The LFM of claim 17, wherein the LFM is operable to accept component ATP requests from multiple centralized fulfillment servers and communicate component quotations or component promises to multiple centralized fulfillment servers.

33. The LFM of claim 17, wherein the LFM is operable to support a subset of a product hierarchy and compute component quotations or component promises based on allocations to products in the hierarchy.

34. A system for automatically managing available-to-promise (ATP) data, comprising:
a client interface operable to facilitate communication between a centralized fulfillment server and a plurality of client systems;
a local fulfillment manager (LFM) interface operable to facilitate communication between the centralized fulfillment server and a plurality of LFMs; and the centralized fulfillment server, the centralized fulfillment server allowing the plurality of client systems to submit ATP requests for quotation without first identifying or directly communicating with any of the plurality of LFMs that are to be used in generating quotations corresponding to the ATP requests, the centralized fulfillment server operable to:

receive a first ATP request from a first one of the plurality of client systems using the client interface, the first ATP request comprising a plurality of request line-items each corresponding to a desired product;

automatically select a first plurality of LFMs from among the plurality of LFMs according to the request line-items within the first ATP request;

generate a plurality of component ATP requests based on the request line-items contained in the first ATP request;

communicate the plurality of component ATP requests to the selected first plurality of LFMs using the LFM interface, one or more component ATP requests being communicated to each LFM in the selected first plurality of LFMs;

receive a plurality of component quotations from the selected first plurality of LFMs through the LFM interface, each component quotation corresponding to a component ATP request and comprising product availability information for one or more desired products corresponding to the component ATP request;

generate a quotation determined according to the product availability information provided by the plurality of component quotations received from the selected first plurality of LFMs; and communicate the quotation to the first one of the plurality of client systems using the client interface.

35. The system of claim 34, wherein the centralized fulfillment server computes the component ATP requests for individual items and the component quotations received from the selected first plurality of LFMs include information and rules regarding how the centralized fulfillment server may mutate those component quotations, the centralized fulfillment server further operable to mutate the component quotations according to the information and rules such that the component quotations together satisfy one or more business constraints.

36. The system of claim 34, wherein the centralized fulfillment server computes the component ATP requests for individual items and is operable to receive component promises from the at least one of the selected first plurality of LFMs that include information and rules about how the centralized fulfillment server may mutate those component promises, the centralized fulfillment server operable to mutate the component promises according to the information and rules such that the component promises together satisfy one or more business constraints, the centralized fulfillment server further operable to communicate the mutated component promises back to the at least one of the selected first plurality of LFMs such that the at least one of the selected first plurality of LFMs may adjust reservations of supply.

37. The system of claim 34, wherein the centralized fulfillment server is operable to:

compute component ATP requests that include all items supplied through the selected first plurality of LFMs and all business constraints on the first ATP request that apply to the items of the component ATP requests;

receive from each of the selected first plurality of LFMs component quotations fulfilling the business constraints; and combine resulting multi-item component quotations to generate the quotation corresponding to the first ATP request.

38. The system of claim 34, wherein the centralized fulfillment server is operable to:

compute component ATP requests that include all items supplied through the selected first plurality of LFMs and all business constraints on the first ATP request that apply to the items of the component ATP requests;

receive from each of the selected first plurality of LFMs component promises fulfilling the business constraints; and combine resulting multi-item component promises to generate a single promise corresponding to the first ATP request.

39. The system of claim 34, wherein:

at least some of the selected first plurality of LFMs hold separate allocations for the same product; and the centralized fulfillment server is further operable to distribute quoting activity across multiple of the selected first plurality of LFMs to obtain component quotations for the product.

40. The system of claim 34, wherein the centralized fulfillment server is also operable as an LFM.

41. A method for automatically managing available-to-promise (ATP) data using a centralized fulfillment server, comprising:

using the centralized fulfillment server to allow a plurality of client systems to submit ATP requests for quotation without first identifying or directly communicating with any of a plurality of ATP servers that are to be used in generating quotations corresponding to the ATP requests;

receiving a first ATP request from a first one of the plurality of client systems using a client interface, the first ATP request comprising a plurality of request line-items each corresponding to a desired product;

automatically selecting a first plurality of ATP servers from among the plurality of ATP servers according to the request line-items within the first ATP request;

generating a plurality of component ATP requests according to the request line-items contained in the first ATP request;

communicating the plurality of component ATP requests to the selected first plurality of the ATP servers using an ATP server interface, one or more component ATP requests being communicated to each ATP server in the selected first plurality of ATP servers;

receiving a plurality of component quotations from the selected first plurality of ATP servers using the ATP server interface, each component quotation corresponding to a component ATP request and comprising product availability information for one or more desired products corresponding to the component ATP request;

generating a quotation in accordance with the product availability information provided by the plurality of component quotations received from the selected first plurality of ATP servers; and communicating the quotation to the first one of the plurality of client systems using the client interface.

42. The method of claim 41, further comprising evaluating the component quotations according to one or more business constraints in generating the quotation, wherein the first ATP request specifies the business constraints.

43. The method of claim 42, wherein at least some business constraints are based on a customer profile.

44. The method of claim 41, further comprising evaluating the component quotations according to at least one supplier-specified business constraint in generating the quotation.

45. The method of claim 41, wherein each of the plurality of ATP servers is associated with a local fulfillment manager (LFM) operable to manage processing of a component ATP request at a planning engine associated with the ATP server.

46. The method of claim 41, further comprising receiving, concurrent with the first ATP request, a second ATP request.

47. The method of claim 41, wherein at least one component ATP request is communicated to a target ATP server of the selected first plurality of ATP servers based on one or more business constraints within the first ATP request.

48. The method of claim 41, further comprising:
using the centralized fulfillment server to allow the plurality of client systems to submit quotation confirmations for promising without directly communicating with any of the plurality of ATP servers that are to be used in generating promises corresponding to the quotation confirmations
receiving a quotation confirmation comprising acceptances of at least some line-items within the quotation, each of the quotation line-items corresponding to a particular accepted product;
automatically selecting one or more second ATP servers from among the selected first plurality of ATP servers according to the acceptances of quotation line-items within the quotation confirmation;
generating a component quotation confirmation for each accepted quotation line-item;
communicating component quotation confirmations to the one or more selected second ATP servers through the ATP server interface;
receiving a plurality of component promises from the one or more selected second ATP servers using the ATP server interface, each corresponding to a component quotation confirmation and each representing a commitment of product availability for corresponding accepted products;
generating a promise comprising commitments of product availability for the accepted products according to the component promises; and
communicating the promise to the first one of the plurality of client systems.

49. The method of claim 48, further comprising evaluating the component promises according to business constraints profiled for a customer in generating the promise.

50. The method of claim 48, further comprising:
receiving a promise acceptance; and
communicating the promise acceptance to the one or more selected second ATP servers for fulfillment of the ATP request.

51. A method for managing available-to-promise (ATP) data at a centralized fulfillment server within a distributed supply chain planning environment, comprising:
using the centralized fulfillment server to allow a plurality of client systems to submit ATP requests for quotation without first identifying or directly communicating with any of a plurality of local fulfillment managers (LFMs) that are to be used in generating quotations corresponding to the ATP requests;
receiving at least one ATP request from a first one of the plurality of client systems, the ATP request comprising a plurality of request line-items each corresponding to a desired product;
automatically selecting a first plurality of LFMs from among the plurality of LFMs according to the request line-items within the first ATP request;
generating a plurality of component ATP requests based on the request line-items contained in the ATP request, each generated component ATP request corresponding to a request line-item; and
communicating the plurality of component ATP requests to the selected first plurality of LFMs for quotation, one or more component ATP requests being communicated to each of the selected first plurality of LFMs, each selected first LFM associated with a planning engine;
receiving a plurality of component quotations from the selected first plurality of LFMs, each component quotation corresponding to a component ATP request and comprising product availability information for one or more desired products corresponding to the component ATP request;
generate a quotation determined according to the product availability information provided by the plurality of component quotations received from the selected first plurality of LFMs; and
communicate the quotation to the first one of the plurality of client systems.

52. The method of claim 51, further comprising:
communicating at least one component ATP request to a target one of the selected first plurality of LFMs based on one or more business constraints within the ATP request, the business constraints being based on a customer profile; and
evaluating the component quotations according to the business constraints in generating the quotation.

53. The method of claim 51, further comprising:
receiving a plurality of component promises from at least one of the selected first plurality of LFMs, each corresponding to a component ATP request and representing a commitment of product availability for the corresponding desired product;
generating a promise comprising commitments of product availability for the desired products according to the component promises; and
communicating the promise to the first one of the plurality of client systems.

54. A method operating at a local fulfillment manager (LFM) for managing available-to-promise (ATP) data, comprising:
receiving one or more component ATP requests from a centralized fulfillment server using a fulfillment server interface operable to facilitate communication between the LFM and the centralized fulfillment server, the centralized fulfillment server allowing a plurality of client systems to submit ATP requests for quotation without first identifying or directly communicating with any of a plurality of LFMs or associated ATP servers that are to be used in generating quotations corresponding to the ATP requests, each component ATP request corresponding to a particular ATP request line-item for a desired product within an ATP request submitted by one of the plurality of client systems to the centralized fulfillment server for quotation;
computing an ATP response for each ATP request line-item using an associated ATP server;
generating a component quotation for each ATP request line-item according to the corresponding ATP response, each component quotation comprising product availability information for the desired product associated with the corresponding component ATP request; and sending each component quotation to the centralized fulfillment server for combination with one or more other component quotations from one or more other LFMs such that a quotation comprising the combined component quotations is returned to the one of the plurality of client systems without the one of the plurality of client systems first identifying or directly communicating with any of the plurality of LFMs from which the component quotations were communicated.

55. The method of claim 54, further comprising assessing the ATP response according to one or more business constraints specified in the ATP request to generate the component quotations.

56. The method of claim 55, wherein at least some business constraints are based on a customer profile.

57. The method of claim 54, further comprising generating the component quotations according to supplier-specified business constraints.

58. The method of claim 54, further comprising computing a portion of the ATP response according to information obtained from the associated ATP server, the LFM managing processing of the component ATP requests at the associated planning engine, the portion depending on the capabilities of the ATP server and its associated planning engine.

59. The method of claim 54, further comprising:

receiving, from the centralized fulfillment server, a component quotation confirmation for each component quotation accepted at the one of the plurality of client systems as a quotation line-item, the centralized fulfillment server allowing the one of the plurality of client systems to submit a quotation confirmation for promising without directly communicating with any of a plurality of LFMs or associated ATP servers that are to be used in generating a promise corresponding to the quotation confirmation;

determining a promise response for each accepted quotation line-item using the associated ATP server;

generating a component promise for each of the accepted quotation line-items, representing a commitment of product availability for the accepted products; and sending the component promises to the centralized fulfillment server for combination with component promises from one or more other LFMs such that a promise comprising the combined component promises is returned to the one of the plurality of client systems without the one of the plurality of client systems directly communicating with any of the plurality of LFMs from which the component promises were communicated.

60. The method of claim 59, further comprising evaluating the promise responses according to business constraints profiled for a customer in generating the component promise.

61. The method of claim 54, wherein component ATP requests correspond to individual items, and further comprising computing component quotations including information and rules regarding how the centralized fulfillment server may mutate the component quotations.

62. The method of claim 54, wherein component ATP requests correspond to individual items, and further comprising computing component promises including information and rules regarding how the centralized fulfillment server may mutate the component promises.

63. The method of claim 54, further comprising:

receiving a sequence of component ATP requests from the centralized fulfillment server, one or more first component ATP requests in the sequence targeted to the LFM;

processing the first component ATP requests targeted for the LFM to compute one or more resulting component quotations;

passing the resulting component quotations, along with one or more remaining component ATP requests in the sequence, to a second LFM targeted by one or more second component ATP requests in the sequence.

64. The method of claim 54, further comprising:

supporting a seller hierarchy also supported by the centralized fulfillment server;

supporting a subset of products supported by the centralized fulfillment server; and computing component quotations or component promises on a per product basis based upon allocations throughout the seller hierarchy for the subset of products.

65. The method of claim 54, further comprising:

supporting a subset of products in a hierarchy of related products supported by the centralized fulfillment server; and computing component quotations or component promises based on allocations for the subset of products throughout the hierarchy.

66. The method of claim 54, further comprising computing availability of generics of a product by sending one or more component ATP requests to a second LFM that corresponds to the generic products.

67. The method of claim 54, wherein the LFM corresponds to a seller within a seller hierarchy supported by the centralized fulfillment server, and further comprising:

holding allocations of supply at the LFM for the corresponding seller;

computing all component quotations or component promises possible with the allocations the LFM contains; and sending the component quotations or component promises to the centralized fulfillment server for combination, for each product, as if the ATP request had been quoted or promised by a single system having all the allocations.

68. The method of claim 67, further comprising computing availability of a corresponding parent seller by sending component ATP requests to a second LFM that corresponds to the parent seller.

69. The method of claim 54, further comprising:

accepting component ATP requests from multiple centralized fulfillment servers; and sending component quotations or component promises to multiple centralized fulfillment servers.

70. The method of claim 54, further comprising:

supporting at the LFM a subset of a product hierarchy; and computing component quotations or component promises at the LFM based on allocations to products in the hierarchy.

71. A method for automatically managing available-to-promise (ATP) data using a centralized fulfillment server, comprising:

using the centralized fulfillment server to allow a plurality of client systems to submit ATP requests for quotation without first identifying or directly communicating with any of a plurality of local fulfillment managers (LFMs) that are to be used in generating quotations corresponding to the ATP requests;

receiving a first ATP request from a first one of the plurality of client systems using a client interface, the first ATP request comprising a plurality of request line-items each corresponding to a desired product;

automatically selecting a first plurality of LFMs from among the plurality of LFMs according to the request line-items contained in the first ATP request;

generating a plurality of component ATP requests based on the plurality of request line-items contained in the first ATP request;

communicating the plurality of component ATP requests to the selected first plurality of LFMs using an LFM interface, one or more component ATP requests being communicated to each LFM in the selected first plurality of LFMs;

receiving a plurality of component quotations from the selected first plurality of LFMs through the LFM interface, each component quotation corresponding to a component ATP request and comprising product availability information for one or more desired products corresponding to the component ATP request;

generating a quotation according to the product availability information provided by the plurality of component quotations received from the selected first plurality of LFMs; and communicating the quotation to the first one of the plurality of client systems using the client interface.

72. The method of claim 71, further comprising:

computing the component ATP requests for individual items, the component quotations received from the selected first plurality of LFMs including information and rules regarding how to mutate the component quotations; and mutating the component quotations according to the information and rules such that the component quotations together satisfy one or more business constraints.

73. The method of claim 71, further comprising:

computing the component ATP requests for individual items, wherein component promises received from the selected first plurality of LFMs include information and rules concerning how to mutate the component promises;

mutating the component promises according to the information and rules, such that the component promises together satisfy one or more business constraints; and communicating the mutated component promises back to the at least one of the selected first plurality of LFMs, such that the at least one of the selected first plurality of LFMs may adjust reservations of supply.

74. The method of claim 71, further comprising:

computing component ATP requests that include all items supplied through the selected first plurality of LFMs and all business constraints on the first ATP request that apply to the items of the component ATP requests;

receiving from each of the selected first plurality of LFMs component quotations fulfilling the business constraints; and combining resulting multi-item component quotations to generate the quotation corresponding to the first ATP request.

75. The method of claim 71, further comprising:

computing component ATP requests that include all items supplied through the selected first plurality of LFMs and all business constraints on the first ATP request that apply to the items of the component ATP requests;

receiving from each of the selected first plurality of LFMs component promises fulfilling the business constraints; and combining resulting multi-item component promises to generate a single promise corresponding to the first ATP request.

76. The method of claim 71, wherein at least some of the selected first plurality of LFMs hold separate allocations for the same product, and further comprising distributing quoting activity across multiple of the selected first plurality of LFMs to obtain component quotations for the product.

* * * * *